US010035928B2

(12) United States Patent
Liu et al.

(10) Patent No.: US 10,035,928 B2
(45) Date of Patent: Jul. 31, 2018

(54) LIGNIN NANOPARTICLE DISPERSIONS AND METHODS FOR PRODUCING AND USING THE SAME

(71) Applicant: Solenis Technologies, L.P., Schaffhausen (CH)

(72) Inventors: Zhaoqing Liu, Pennington, NJ (US); John C. Gast, Hockessin, DE (US); Kyle J. Bottorff, Newark, DE (US)

(73) Assignee: Solenis Technologies, L.P., Wilmington, DE (US)

( * ) Notice: Subject to any disclaimer, the term of this patent is extended or adjusted under 35 U.S.C. 154(b) by 545 days.

(21) Appl. No.: 14/569,429

(22) Filed: Dec. 12, 2014

(65) Prior Publication Data

US 2015/0166836 A1 Jun. 18, 2015

Related U.S. Application Data

(60) Provisional application No. 61/915,442, filed on Dec. 12, 2013.

(51) Int. Cl.
*C09D 197/00* (2006.01)
*C07G 1/00* (2011.01)

(52) U.S. Cl.
CPC .......... *C09D 197/005* (2013.01); *C07G 1/00* (2013.01)

(58) Field of Classification Search
CPC .................................................. C09D 197/005
See application file for complete search history.

(56) References Cited

U.S. PATENT DOCUMENTS

| 3,956,261 A | 5/1976 | Lin |
| 4,454,066 A | 6/1984 | Dilling et al. |
| 4,957,557 A * | 9/1990 | Dimitri ................ C08L 97/005 106/501.1 |
| 5,008,378 A * | 4/1991 | Dimitri ................ C08L 97/005 106/238 |

(Continued)

FOREIGN PATENT DOCUMENTS

| CN | 101394942 A | 3/2009 |
| CN | 102002165 | 4/2011 |

(Continued)

OTHER PUBLICATIONS

Frangville et al. Fabrication of Environmentally Biodegradable Lignin Nanoparticles. ChemPhysChem 2012, 13, 4235-4243 (Year: 2012).*

(Continued)

*Primary Examiner* — Cachet I Sellman
(74) *Attorney, Agent, or Firm* — LKGlobal | Lorenz & Kopf, LLP

(57) ABSTRACT

A mild, simple process of preparing lignin nanoparticle dispersions is disclosed. Additionally, compositions and methods of making lignin nanoparticle-polymer complexes comprising derivatized and/or non-derivatized lignin nanoparticle dispersions and water soluble and/or water dispersible polymers are disclosed. Further, methods of using at least one of the lignin nanoparticle dispersions, derivatized lignin nanoparticle dispersions, and/or the lignin nanoparticle-polymer complex to impart rinse-resistant properties, such as hydrophilic properties, to substrates, or function as tunable nanoparticle surfactants are disclosed.

17 Claims, 23 Drawing Sheets

(56) References Cited

U.S. PATENT DOCUMENTS

| | | | | |
|---|---|---|---|---|
| 5,192,361 | A | * | 3/1993 | Schilling ............... C09D 11/14 106/123.13 |
| 5,972,047 | A | | 10/1999 | Dilling et al. |
| 5,989,299 | A | | 11/1999 | Dilling et al. |
| 7,691,982 | B2 | * | 4/2010 | Tomita ............... B01F 17/0028 530/500 |
| 2011/0297340 | A1 | * | 12/2011 | Kouisni ............. D21C 11/0007 162/16 |

FOREIGN PATENT DOCUMENTS

| | | |
|---|---|---|
| CN | 103254452 | 8/2013 |
| CN | 103275331 | 9/2013 |
| WO | 2006033464 A1 | 3/2006 |
| WO | 2007100861 A1 | 9/2007 |
| WO | 2015089456 A1 | 6/2015 |

OTHER PUBLICATIONS

Cui et al., "Toward Thermoplastic Lignin Polymers; Part II: Thermal & Polymer Characteristics of kraft Lignin & Derivatives," BioResources 8 (1), pp. 864-886, 2013.

Krachler et al., Nanoscale lignin particles as sources of dissolved iron to the ocean, Global Biogeochemical Cycles, vol. 26, BG3024/1-GB3024/9, 2012.

J. Gilca et al., "Obtaining Lignin Nanoparticles by Sonication", Ultrasonics, Sonochemistry 23, p. 369-376, 2015.

Lu et al., "Comparative antioxidant activity of nanoscale lignin prepared by a supercritical anisolvent (SAS) process with non-nanoscale lignin", Food Chemistry, vol. 135, p. 63-67, 2012.

John J. Meister, "Modification of Lignin", Plastic Engineering, pp. 69-144, 1st ed. (2000).

B. J. Kim, "Nanoparticle Surfactants as a route to Bicontinuous Block Copolymer Morphologies", Langmuir. vol. 23, 7804-7809, 2007.

Larson-Smith et al., "Pickering Emulsions Stabilized by Nanoparticle Surfactants", Langmuir 28, 11725-32, 2012.

Canadian Intellectual Property Office, Office Action in Canadian Patent Application No. 2,930,604 dated May 1, 2017.

Laura Nevarez, et al., "Biopolymer-based nanocomposites: effect of lignin acetylation in cellulose triacetate films," Science and Technology of Advanced Materials, Aug. 1, 2011, pp. 1-16, XP55175146, doi: 10.1088/1468-6996/12/4/045006, retrieved on Oct. 3, 2015 from: URL:http://iopscience.iop.org/1468-6996/12/4/045006.

The State Intellectual Property Office of the People's Republic of China, Office Action in Chinese Patent Application No. 201480067165.9 dated Apr. 2, 2018.

Ruiqin Zhang, "Biomass Derived Fuels and Chemicals," Zhengzhou University Press, Sep. 30, 2004, pp. 72-77.

* cited by examiner

AFM Images of Glass Cover Slip

AFM Images of Tap-Water Rinsed Glass Cover Slip

AFM Images of Lignin Nanoparticle-Treated Glass Cover Slip

AFM Images of In-situ Formed Lignin nanoparticle on Glass Cover Slips

Treated vinyl surface on left; untreated vinyl on the right.

Treated laminate surface on the right; untreated laminate on the left.

Treated vinyl surface on the left; untreated vinyl on the right.

Treated ceramic on the right; untreated ceramic on the left.

Treated aluminum on the left; untreated aluminum on the right.

Treated stainless steel on the left half; untreated stainless steel on the right half.

Treated polypropylene on the left; untreated polypropylene on the right.

Treated glass on the right; untreated glass on the left.

Treated felt fabric on left and right; untreated felt fabric in the middle.

Treated polypropylene on the right; untreated polypropylene on the left.

Treated aluminum on the left; untreated aluminum on the right.

LIGNIN NANOPARTICLE DISPERSIONS AND METHODS FOR PRODUCING AND USING THE SAME

The present application claims the benefit under 35 U.S.C. 119(e) of U.S. Provisional Application No. 61/915,442. The entirety of which is hereby expressly incorporated herein by reference.

BACKGROUND

1. Field

The presently disclosed and/or claimed inventive process(es), procedure(s), method(s), product(s), result(s) and/or concept(s) (collectively hereinafter referred to as the "presently disclosed and/or claimed inventive concept(s)") relates generally to lignin nanoparticle dispersions and/or derivatized lignin nanoparticle dispersions. More particularly, but not by way of limitation, the presently disclosed and/or claimed inventive concept(s) relates to a mild, simple process of preparing lignin nanoparticle dispersions. The presently disclosed and/or claimed inventive concept(s) also relates generally to the compositions and methods of making dispersions of lignin nanoparticle-polymer complexes comprising water dispersible and/or water soluble polymers and derivatized and/or non-derivatized lignin nanoparticles.

Additionally, the presently disclosed and/or claimed inventive concept(s) relates generally to a method of using at least one of the lignin nanoparticle dispersions to impart rinse-resistant adsorption of the lignin nanoparticles to a substrate. Further, the presently disclosed and/or claimed inventive concept(s) relates generally to a method of using at least one of the lignin nanoparticle dispersions and/or dispersion of the lignin nanoparticle-polymer complex to impart rinse-resistant hydrophilic properties to surfaces, or function as a nanoparticle surfactant.

2. Background

Lignin is a complex chemical compound integral to the secondary cell walls of plants and some algae. Lignin is most commonly derived from wood, but it is also derived from secondary sources such as corn stover, grass, straws, and other non-woody sources. As such, lignin is an abundant source of renewable material, second only to cellulose. The major sources of lignin are the various chemical wood pulping processes that generate "liquor" byproducts containing lignin, hemicelluloses, and other extracts that are left over after the cellulose fibers have been separated from wood. Several of the more popular chemical pulping processes over the years have been the sulfate process (commonly referred to as the "kraft" process) and the sulfite process. However, since about 1940 the kraft process has been the dominant process. As of 2008, the kraft process accounted for approximately 90% of the pulp produced by chemical processes, globally generating around 1.3 billion tons of "black" liquor per year.

Until recently, lignin contained in liquors from wood pulping, specifically the "black" liquor of the kraft process, was unable to be effectively extracted and the liquors were often burned as an alternative fuel source. With the advent of new capabilities for extracting lignin from liquor byproducts, e.g., the LignoBoost® technology (Innventia AB) and the LignoForce™ technology (FP Innovations, Point-Clair, PQ) to specifically isolate lignin from the "black" liquor byproduct of the kraft process, an industrial need has emerged to develop value-added products from lignin in order to take full advantage of lignin as a raw material.

Previous attempts to use lignin, especially kraft lignin, for value-added products, led to the discovery of a variety of ways that lignin can be derivatized in order to increase the functionality of lignin. For example, Cui et al. (2013), "Lignin polymers: Part 2," BioResources 8(1), 864-886, hereby incorporated by reference in its entirety, discloses blocking the phenolic units of lignin via ether formation to increase the thermal stability of kraft lignin so that the lignin can be used in thermoplastic materials.

Lignin derivatives are also disclosed in U.S. Pat. No. 3,956,261, hereby incorporated by reference in its entirety, wherein etherification of the lignin phenolic groups was used to add functional groups, such as carboxylate, to the lignin for specific industrial uses. Blocking the phenolic groups by etherification can also reduce the intensity of the black color associated with lignin obtained from the kraft and sulfite pulping processes, as described in U.S. Pat. No. 4,454,066 and hereby incorporated by reference in its entirety. Alternative methods of derivatizing lignin also include methylolation of lignin using formaldehyde as disclosed in, for example U.S. Pat. No. 5,972,047 and U.S. Pat. No. 5,989,299, both of which are hereby incorporated by reference in their entirety, and graft polymerization of the lignin as disclosed in, for example U.S. Pat. No. 7,691,982, hereby incorporated by reference in its entirety. Additional methods of derivatizing lignin are also reviewed in John J. Meister, Plastic Engineering, "Modification of Lignin", pps. 67-144. Vol. 60. Polymer Modification: Principles, Techniques, and Applications, Ed. John J. Meister (1st. ed. 2000), hereby incorporated by reference in its entirety. Currently, such methods for derivatizing lignin require intensive processing or the use of organic solvents or hazardous chemicals like formaldehyde, ethylene oxide, and other alkylene oxides.

In recent years there has also been a growing interest in the field of nanotechnology including some interest in lignin nanoparticles. Although naturally occurring lignin nanoparticles have been detected in the ocean as dissolved iron carriers, as disclosed in Krachler et al., Global Biogeochemical Cycles 26, GB3024/1-GB3024/9, (2012), hereby incorporated by reference in its entirety, naturally occurring lignin nanoparticles such as these are rare and not economically feasible to harvest for general applications.

Nanoparticles can have physical and chemical properties that are generally attributable to their nanoscale size. Recently, processes for obtaining lignin nanoparticles have emerged including, for example but not limited to, physical methods based on processes that either use ultrasounds and/or grinders and/or anti-solvents (i.e., solvents in which the product is insoluble) and/or processes that adjust the pH of strong alkaline solutions of lignin, as well as chemical methods comprising, for example, lignin hydroxymethylation and/or lignin sulfonation. See, e.g., J. Gilca et al., "Obtaining Lignin Nanoparticles by Sonication." Ultrason. Sonochem. 23, p. 369-376, (2015).

Lignin nanoparticles have generally been obtained, however, from lignin aqueous solutions with or without an organic solvent by lowering the pH of the solution under shear, as disclosed in, for example, C. Frangville, Chem. Phys. Chem. 13, p. 4235, (2012) and patent publication CN103275331A, both of which are hereby incorporated by reference in their entirety. Additionally, supercritical carbon dioxide has been used as an anti-solvent to obtain lignin nanoparticles from solutions of lignin in acetone or dioxane, as described in, for example, Lu et al., Food Chemistry, 135, p. 63 (2012) and patent publication CN102002165A, both of which are hereby incorporated by reference in their entirety.

Cross-linking agents, such as aldehydes, have also been used to modify lignin nanoparticles, as disclosed in patent publication CN103254452. Additionally, lignin nanoparticle dispersions have been obtained directly from water insoluble kraft lignin by chemical derivatization in water, as exemplified in U.S. Pat. No. 4,957,557, hereby incorporated by reference in its entirety. However, such methods of chemical derivatization in water, including those disclosed in U.S. Pat. No. 4,957,557, require the use of hazardous chemicals like formaldehyde in order to prepare the lignin-based nanoparticles in water.

However, as suggested above, methods disclosed in the prior art for preparing lignin nanoparticles, and dispersions of such, often lack the efficiency necessary to make lignin a cost effective source of raw material, as well as pose safety and environmental risks by requiring the use of organic solvents, such as dioxane, and/or requiring pressurized process components. Additionally, methods disclosed in the prior art generally produce nanoparticle dispersions that contain organic solvent impurities that require further processing and added cost. As such, there exists an industrial need for a cost effective method of preparing lignin nanoparticles in water without the use of solvents or hazardous chemicals. Such lignin nanoparticles would be useful in downstream "value-added processes" and would, therefore, have a better economic use than simply burning the lignin as a fuel.

Methods are disclosed herein that provide economical and efficient methods of preparing stable dispersions of lignin (and/or derivatized lignin) nanoparticles in water. These methods do not require the use of hazardous chemicals and may have less environmental impact than methods currently in the prior art. Additionally, methods are disclosed herein that broaden the scope of available applications for dispersions of lignin nanoparticles and derivatized lignin nanoparticles, such as, for example but without limitation, nanoparticle surfactants as defined below. In particular, disclosed herein is a method of treating substrates (herein also referred to as a "surface" or "interface") with dispersions of lignin nanoparticles or derivatized lignin nanoparticles whereby the lignin nanoparticles and/or derivatized lignin nanoparticles can impart rinse resistant (as defined hereinafter) adsorption of the particles to such surfaces due to a strong surface affinity (defined herein below) for both inorganic and organic surfaces. In one embodiment, the dispersions of lignin nanoparticles and/or derivatized lignin nanoparticles can impart the properties of lignin or derivatized lignin such as, for example but without limitation, hydrophilicity, hydrophobicity, antimicrobial, antioxidant, anti-soiling, UV-protection, on a substrate. A "substrate", as used herein, is defined to mean any solid surface on which a coating layer of material may be deposited by means of including, for example but without limitation, adsorption.

A lignin nanoparticle-polymer complex and dispersion thereof is also disclosed herein comprising lignin nanoparticles and/or derivatized lignin nanoparticles and at least one water dispersible and/or water soluble polymer. The lignin nanoparticle-polymer complex, as disclosed herein, can also impart rinse resistant properties to surfaces, wherein the degree of resistance may be strongly impacted by the ratio of the lignin nanoparticles and/or derivatized lignin nanoparticles to the water dispersible and/or water soluble polymer. Additionally, the lignin nanoparticle-polymer complex, as disclosed herein, can function as a tunable nanoparticle surfactant.

A "nanoparticle surfactant" is defined herein as either (a) two materials with hydrophilic and hydrophobic character, wherein at least one of which is a nanoparticle, or (b) as a single nanoparticle having two or more domains with hydrophilic and hydrophobic character, and wherein the nanoparticle surfactant can impart properties normally associated with surfactants. The "tunable" property of the nanoparticle surfactant is defined herein as the ability to modify the type and/or the amount of the polymer in the above-referenced lignin nanoparticle-polymer complex without chemically bonding the water dispersible and/or water soluble polymer to the lignin nanoparticle and/or derivatized lignin nanoparticle. In one embodiment, the lignin nanoparticle-polymer complexes, as described above, can impart properties of both (i) the water dispersible and/or waters soluble polymer and (ii) the lignin, including, for example but without limitation, hydrophilicity, hydrophobicity, antimicrobial, and anti-soiling characteristics depending on the water dispersible and/or water soluble polymer that is used.

SUMMARY

The presently disclosed and/or claimed inventive concept(s) encompasses lignin nanoparticle dispersions, methods of preparing lignin nanoparticle dispersions, and uses thereof. Additionally, the presently disclosed and/or claimed inventive concept(s) encompasses lignin nanoparticle-polymer complexes and dispersions thereof comprising derivatized and/or non-derivatized lignin nanoparticles and water dispersible and/or water soluble polymer(s) and methods of making the same.

The presently disclosed and/or claimed inventive concept(s) further encompass a method of treating a substrate with at least one of the lignin nanoparticle dispersions and/or derivatized lignin nanoparticle dispersions, wherein the nanoparticles adsorb to the substrate. The presently disclosed and/or claimed inventive concept(s) further encompass a method of using at least one of the lignin nanoparticle dispersions, derivatized lignin nanoparticle dispersions, and/or dispersions of lignin nanoparticle-polymer complexes to impart rinse-resistant properties to substrates, or function as nanoparticle surfactants.

DETAILED DESCRIPTION OF THE INVENTIVE CONCEPT(S)

Figure 1:
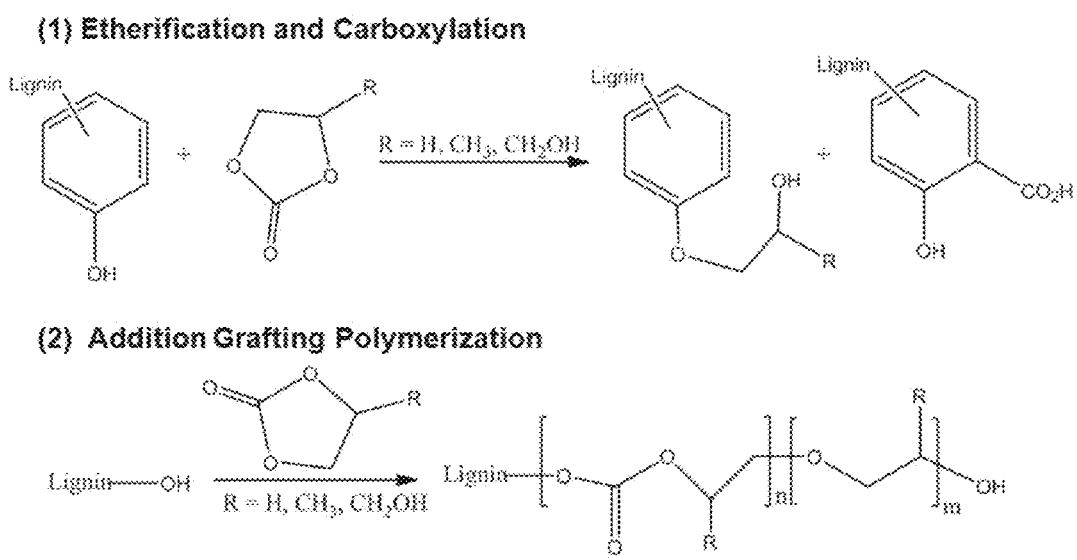
FIG. 1 is an illustration of the reaction mechanisms for etherification, carboxylation, and addition grafting polymerization of lignin.
Figure 2:
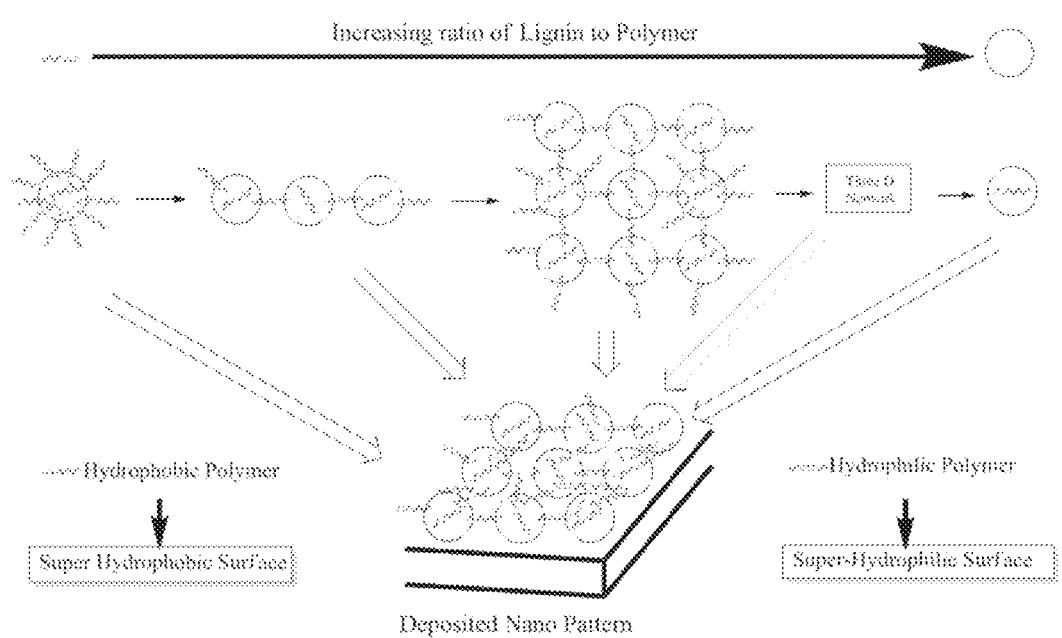
FIG. 2 is a graphical representation illustrating that a nanoparticle-polymer complex network forms when lignin nanoparticles and/or derivatized lignin nanoparticles are added to a water dispersible and/or water soluble polymer at a ratio that supports the formation of the complex. The ratio of lignin nanoparticles and/or derivatized lignin nanoparticles to water dispersible and/or water soluble polymer will vary depending on the properties and functionalities of the polymer and lignin nanoparticles and/or derivatized lignin nanoparticles. Lignin nanoparticle/polymer complexes thus formed demonstrate strong surface interactions. Optionally, the lignin nanoparticle-polymer complex network can be deposited onto a surface while the network is still forming.

Before explaining at least one embodiment of the presently disclosed and/or claimed inventive concept(s) in detail, it is to be understood that the presently disclosed and/or claimed inventive concept(s) is not limited in its application to the details of construction and the arrangement of the components or steps or methodologies set forth in the following description or illustrated in the drawings. The presently disclosed and/or claimed inventive concept(s) is capable of other embodiments or of being practiced or carried out in various ways. Also, it is to be understood that the phraseology and terminology employed herein is for the purpose of description and should not be regarded as limiting.

Unless otherwise defined herein, technical terms used in connection with the presently disclosed and/or claimed inventive concept(s) shall have the meanings that are commonly understood by those of ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the presently disclosed and/or claimed inventive concept(s) pertains. All patents, published patent applications, and non-patent publications referenced in any portion of this application are herein expressly incorporated by reference in their entirety to the same extent as if each individual patent or publication was specifically and individually indicated to be incorporated by reference.

All of the articles and/or methods disclosed herein can be made and executed without undue experimentation in light of the present disclosure. While the articles and methods of the presently disclosed and/or claimed inventive concept(s) have been described in terms of preferred embodiments, it will be apparent to those of ordinary skill in the art that variations may be applied to the articles and/or methods and in the steps or in the sequence of steps of the method described herein without departing from the concept, spirit and scope of the presently disclosed and/or claimed inventive concept(s). All such similar substitutes and modifications apparent to those skilled in the art are deemed to be within the spirit, scope and concept of the presently disclosed and/or claimed inventive concept(s).

As utilized in accordance with the present disclosure, the following terms, unless otherwise indicated, shall be understood to have the following meanings.

The use of the word "a" or "an" when used in conjunction with the term "comprising" may mean "one," but it is also consistent with the meaning of "one or more," "at least one," and "one or more than one." The use of the term "or" is used to mean "and/or" unless explicitly indicated to refer to alternatives only if the alternatives are mutually exclusive, although the disclosure supports a definition that refers to only alternatives and "and/or." Throughout this application, the term "about" is used to indicate that a value includes the inherent variation of error for the quantifying device, the method being employed to determine the value, or the variation that exists among the study subjects. For example, but not by way of limitation, when the term "about" is utilized, the designated value may vary by plus or minus twelve percent, or eleven percent, or ten percent, or nine percent, or eight percent, or seven percent, or six percent, or five percent, or four percent, or three percent, or two percent, or one percent. The use of the term "at least one" will be understood to include one as well as any quantity more than one, including but not limited to, 1, 2, 3, 4, 5, 10, 15, 20, 30, 40, 50, 100, etc. The term "at least one" may extend up to 100 or 1000 or more depending on the term to which it is attached. In addition, the quantities of 100/1000 are not to be considered limiting as lower or higher limits may also produce satisfactory results. In addition, the use of the term "at least one of X, Y, and Z" will be understood to include X alone, Y alone, and Z alone, as well as any combination of X, Y, and Z. The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. The term "or combinations thereof" as used herein refers to all permutations and combinations of the listed items preceding the term. For example, "A, B, C, or combinations thereof" is intended to include at least one of: A, B, C, AB, AC, BC, or ABC and, if order is important in a particular context, also BA, CA, CB, CBA, BCA, ACB, BAC, or CAB. Continuing with this example, expressly included are combinations that contain repeats of one or more item or term, such as BB, AAA, MB, BBC, AAAB-CCCC, CBBAAA, CABABB, and so forth. The skilled artisan will understand that typically there is no limit on the number of items or terms in any combination, unless otherwise apparent from the context.

The presently disclosed and/or claimed inventive concept(s) encompasses a method(s) for preparing a lignin nanoparticle dispersion in water comprising, consisting of, or consisting essentially of: (a) combining (i) a base, which is not an inorganic divalent base, (ii) lignin, and (iii) water to form a lignin composition comprising, consisting of, or consisting essentially of lignin in the range of from about 1 to about 70 wt %, or from about 5 to about 40 wt %, or from about 15 to about 30 wt %, and has a pH in a range that favors the formation of a stable dispersion of lignin nanoparticles (as defined in more detail below) without dissolving the lignin in water to form a solution (as defined in more detail below), and (b) heating the lignin composition while stirring to a temperature in the range of from about 30 to about 100° C., or in the range of from about 70 to about 100° C., or in the range from about 80 to about 100° C. to form a lignin nanoparticle dispersion. Optionally, additional water may be added after the step of heating and stirring the lignin composition. The water may be at a temperature in a range of from about 0° C. to about 70° C., or from about 5 to about 35° C.

In an alternative embodiment, the method for preparing a lignin nanoparticle dispersion in water, as described above, can be carried out under pressure and the lignin composition can be heated, while stirring, to a temperature in the range of from about 100 to about 200° C., or from about 100 to about 150° C., or from about 100 to about 120° C., or from about 100 to about 110° C., wherein the temperature is related to the pressure and the pressure can be in the range of from about 1 to about 40 atm, or from about 1 to about 20 atm, or from about 1 to about 15 atm, or from about 1 to about 10 atm, or from about 1 to about 5 atm.

In one embodiment, the lignin composition may be heated to the above-described temperature ranges within 140 minutes, or within 40 minutes, or within 25 minutes, or within 10 minutes, or within 2.5 minutes, or within 1 minute, or within 30 seconds, or within 10 seconds of combining the base with the lignin and water.

The base may be added as either a solid or in solution at any stage of the mixing and/or heating steps in order to have a smooth reaction. In an additional embodiment, the base may be added in one step, multiple steps, or continuously throughout the mixing and/or heating steps.

In one embodiment, the lignin and water are combined prior to the addition of the base, forming a mixture of lignin and water having a pH less than or equal to 6, or less than 5.5, or from about 2 to about 5.5. The base can then be added until the pH is in a range that favors the formation of a stable dispersion of lignin nanoparticles without dissolving the lignin in water to form a solution.

In one embodiment, the base is added until the pH is in a range of from 7 to 9, or from 7 to 10, or from 7 to 10.5. As one of ordinary skill in the art would appreciate, however, different types of lignin have various levels of solubility in water and, as such, the pH range suitable for the formation of nanoparticle dispersions using the above-described method may differ depending on the type of lignin or combinations of lignin and/or lignin nanoparticles to be dispersed. Such variations in pH ranges are hereby deemed to encompass the presently claimed and/or disclosed inventive concept(s).

The base, as disclosed herein, is a composition which can increase the pH of, for example but without limitation, the mixture of lignin and water, and may be selected from the group consisting of alkali hydroxides, ammonium hydroxide, alkyl-substituted ammonium hydroxides, organic amines, alkali carbonates or bicarbonates, ammonium carbonates or bicarbonates, alkyl-substituted ammonium carbonates or bicarbonates, and combinations thereof.

In one embodiment, the base may be selected from the group consisting of ammonium hydroxide, potassium carbonate, potassium hydroxide, sodium carbonate, sodium hydroxide, triethanolamine, and combinations thereof.

The lignin in the above-described method for preparing lignin nanoparticle dispersions, may be in any form including, for example but without limitation, isolated lignin, (e.g., kraft lignin isolated from the LignoBoost® (Innventia AB, Stockholm, Sweden) or LignoForce™ (FP Innovations, Point-Clair, PQ) processes), derivatized lignin, lignin nanoparticles, and/or combinations thereof. As used herein, "isolated lignin" refers to lignin that has been relatively unmodified as compared to a "derivatized lignin" that has been modified by chemical reaction to obtain different properties than natural lignin.

In one embodiment, the lignin comprises isolated lignin. The isolated lignin may be obtained, produced, or "isolated" from a process selected from the group consisting of kraft, solvent extraction, biofuel processing, organosolv, Bjorkman process, steam explosion, cellulolytic enzyme, acid hydrolysis, soda lime, LignoBoost® (Innventia AB, Stockholm, Sweden), LignoForce™ (FP Innovations, Point-Clair, PQ), and combinations thereof. In one embodiment, the lignin is kraft lignin obtained from the kraft process of converting wood into wood pulp. In another embodiment, the lignin is kraft lignin isolated by at least one of the LignoBoost® process (Innventia AB, Stockholm, Sweden). In yet another embodiment, the lignin is water insoluble sulfite lignin obtained from the sulfite process of converting wood into wood pulp. In an alternative embodiment, the lignin may be phenol-formaldehyde resins.

The lignin may also be any type of lignin, or isolated lignin as described above, having undergone any suitable method(s) for derivatizing the lignin, such as for example but without limitation, etherification or graft polymerization of the hydroxyl functions of lignin with at least one of polyether and polycarbonate. As such, "derivatized lignin", as used herein, refers to any type of lignin having undergone any suitable method(s) for derivatizing the lignin, such as for example but without limitation, etherification or graft polymerization of the hydroxyl functions of lignin with at least one of polyether and polycarbonate, and including, without limitation, any of the methods detailed below. Additional methods of derivatizing lignin are disclosed in John J. Meister, Plastic Engineering, "Modification of Lignin", pps. 67-144 (1st. ed. 2000), the entire contents of which is incorporated herein by reference in its entirety. The following are yet further non-limiting ways that lignin can be derivatized:

(i) Lignin can be derivatized by heat treating at temperatures ranging from about 120 to about 200° C. to increase its molecular weight, after which the lignin can be selectively reduced by, for example but without limitation, hydrogenation, or alternatively the heat treated lignin can be oxidized by, for example but without limitation, hydrogen peroxide or chlorine dioxide, in order to enhance selective functionalities;

(ii) Lignin can be derivatized by alkylation of the hydroxyl group(s) of the lignin by reacting lignin with alcohol in the presence of a catalyst, or reacting the lignin with at least one of alkyl halides, alkyl sulfates, alkylene epoxides such as methyl chloride, dimethyl sulfate, diethyl sulfate, monochloroacetate salt or ester, epichlorohydrin, N-(3-chloro-2-hydroxypropyl) trimethylammonium chloride, ethylene oxides, propylene oxides, butylene oxides, or combinations thereof. The potential reaction sites on the lignin can be the α-hydroxyketone group(s), carbonyl group(s), carboxyl group(s), aromatic group(s), and the primary and/or secondary hydroxyl group(s). The aromatic hydroxyl group(s) can be alkylated through Michael addition to unsaturated compounds of $R^1R^2C=CR^3R^4$, where $R^1$, $R^2$ $R^3$ and $R^4$ are hydrogen or alkyl groups which can bear various functionalities. Typical unsaturated compounds include, for example but without limitation, (meth)acrylates, (meth)acrylamides, vinyl phosphonate, vinyl esters, vinyl ethers, vinylamides, and combinations thereof;

(iii) Lignin can be derivatized by methylolation and amination by attaching lignin to at least one of the functionalities (a) $CH_2OR$ through reactions with formaldehyde in water or with an alcohol, or (b) $CH_2N(R')R''$ if combined with an amine, where R, R' and R'' are hydrogen or alkyl groups which can bear various functionalities. The potential reaction sites can be the aromatic ring(s) and ketone function(s) of the lignin;

(iv) Lignin can be derivatized by carboxylation by at least one of oxidation, alkylation by halogenated carboxylic acid, or by Kolb-Schmitt reaction wherein $CO_2$ is reacted with the phenol group(s) of lignin to add a carboxylic acid to the aromatic ring;

(v) Lignin can be derivatized by sulfomethylation and sulfonation, which adds at least one of the groups consisting of methylene sulfonate ($CH_2SO_3^-$) or sulfonate ($SO_3^-$), and combinations thereof to lignin. Sulfomethylation can occur on aromatic rings bearing at least one hydroxyl group or on the α-carbon of a carbonyl group. Sulfite generally reacts with lignin by substitution with benzylic hydroxyl, alkoxyl or methylolyl groups, wherein the methylolyl group is generally the derivative of lignin reacting with formaldehyde naturally or synthetically;

(vi) Lignin can be derivatized by Phosphorylation, which adds at least one phosphate group to lignin. Phosphorylation can be done by reacting the hydroxyl group(s) of lignin with $POCl_3$, phosphorus pentaoxide, polyphosphoric acid, or combinations thereof;

(vii) Lignin can be derivatized by esterification of lignin, which is done by reacting the hydroxyl group(s) of lignin with a carboxylic acid anhydride or chloride, or alternatively through transesterification;

(viii) Additionally, lignin can be derivatized under anhydrous conditions, wherein the aromatic ring(s) of lignin can be alkylated or acylated through carbocation intermediates. Such a reaction can be useful when it is necessary to add additional hydrophobes to lignin. For example, reacting the aromatic ring(s) of lignin with styrene can enhance the affinity of lignin for hydrophobic surfaces; and/or (ix) Lignin can also be derivatized by grafting polymerization to introduce polymer chains to lignin, which is generally done by chain growth polymerization such as radical polymerization, or by ring opening polymerization, or alternatively by step growth polymerization wherein lignin molecules may be cross-linked together. Many studies have been done to graft lignin with vinyl monomers through radical polymerization and, as such, is well known in the art.

Other methods of derivatizing lignin are known to those of ordinary skill in the art and are considered as part of the disclosure contained herein. Additionally, derivatized lignin or derivatized lignin in the form of nanoparticles from any method, including those disclosed herein, can also be dispersed in water using the above-described process of dispersing the lignin nanoparticles.

In an alternative embodiment, one or more solvents may be added to the lignin composition, although this is not necessary for the presently disclosed and/or claimed inventive concept(s) for preparing lignin nanoparticle dispersions in water. If a solvent is used, the solvent may be selected from the group consisting of alcohols, glycols, polyhydric alcohols, ketones, ethers, dialkyl sulfoxide, amides of water-miscible solvents, and combinations thereof. Additional solvents would be apparent to those of ordinary skill in the art and are contemplated for use herein.

The lignin may also be in the form of nanoparticles obtained from any type of lignin having undergone a process to mechanically or chemically modify lignin into lignin nanoparticles. As used herein, the term "nanoparticle" shall mean particles that are predominantly less than 600 nm in size. The definition of "lignin nanoparticle dispersion" is defined later herein.

In one embodiment, the lignin nanoparticles are obtained from a mechanical process such as grinding the lignin or using ultrasound on the lignin. In another embodiment, the lignin nanoparticles are synthesized from a chemical process selected from at least one of lignin hydroxymethylation and chemical vapor deposition. As one of ordinary skill in the art would appreciate based on the foregoing, the process by which the lignin nanoparticles are obtained is immaterial—lignin nanoparticles from any source or produced according to any process are contemplated for use with the presently disclosed and/or claimed inventive concept(s).

In one embodiment the lignin comprises derivatized lignin produced by a method(s) comprising, consisting of, or consisting essentially of: (i) mixing lignin with a carbonate ester-containing compound at a molar ratio in the range of from about 10:1 to about 1:1000, or from about 5:1 to about 1:100, or from about 3:1 to about 1:3 of the phenolic hydroxyl function of lignin to the carbonate ester to form a lignin mixture, (ii) removing the residual moisture in the lignin mixture, and (iii) heating the lignin mixture to a temperature in the range of from about 120 to about 190° C., in the presence of a catalyst which can be selected from the group consisting of alkaline carbonate, alkaline earth carbonate, and combinations thereof. Optionally, more carbonate ester can be fed into the reaction mixture for a higher content of grafted polyether functions. The residual moisture of the mixture is removed by vacuum drying. The residual moisture would be well known to those of ordinary skill in the art. Additionally and/or alternatively, the mixture is heated to a temperature in the range of from about 150 to about 160° C. for about 20 minutes to about 5 hours, or for about 20 minutes to about 3 hours, or about 20 minutes to about 1 hour, wherein the time is dependent on whether additional carbonate ester-containing compound is required for a higher content of grafted polyether functions.

In another embodiment, the derivatized lignin described above can be produced and dispersed by a method comprising the steps of: (i) mixing lignin with a carbonate ester-containing compound and a base to form a lignin mixture, wherein the lignin is mixed with the carbonate ester-containing compound at a molar ratio in the range of from about 10:1 to about 1:1000, or from about 5:1 to about 1:100, or from about 3:1 to about 1:3 of the phenolic hydroxyl function of lignin to the carbonate ester (ii) removing residual moisture in the lignin mixture, and (iii) heating the lignin mixture in the presence of a catalyst, wherein the catalyst is selected from the group consisting of alkaline carbonate, alkaline earth carbonate, and combinations thereof, to a temperature of about 150 to 160° C. for about 20 minutes to about 2 hours, or from about 20 minutes to an hour, (iv) allowing the lignin mixture to cool to a temperature of about 100 to 130° C., (v) adding water and, optionally, a second base, to the mixture while stirring to form an aqueous lignin mixture and (vi) refluxing the aqueous lignin mixture at around 100° C. to form a homogeneous liquid nanoparticle dispersion.

The carbonate ester-containing compound is at least one of a linear or cyclic carbonate ester, and combinations thereof. The linear or cyclic carbonate esters comprise, for example but without limitation, dimethyl carbonate, diethyl carbonate, glycerol carbonate, ethylene carbonate, propylene carbonate, and butylene carbonate. Optionally, the carbonate ester can be added in combination with a solvent, wherein the solvent is inert such as, for example but without limitation, dioxane, dimethyl sulfoxide, and N,N-dimethylformamide, although the addition of a solvent may be unnecessary. The carbonate ester-containing compound may have a general formula of $R^5O—C(=O)—OR^6$, wherein $R^5$ and $R^6$ are selected from the group consisting of alkyl, cyclic alkyl, cyclic alkylene groups, and combinations thereof, wherein the alkyl, cyclic alkyl and cyclic alkylene optionally comprise additional functional groups.

Turning to FIG. 1, a cyclic carbonate ester may be used for the step of etherification and carboxylation of lignin. However, graft polymerization of a polyether and/or a polycarbonate onto lignin requires the use of a cyclic carbonate ester. The cyclic carbonate ester may be glycerol carbonate, which has been found to boost the water-solubility of lignin and increase the functionality of hydroxyl groups.

The source of lignin for any one of the derivatized lignins, as described herein, may be obtained from any process including, for example but without limitation, a process selected from the group consisting of kraft, solvent extraction, biofuel processing, organosolv, Bjorkman process, steam explosion, cellulolytic enzyme, acid hydrolysis, soda lime, LignoBoost® (Innventia AB, Stockholm, Sweden), LignoForce™ (FP Innovations, Point-Clair, PQ), and combinations thereof.

In one embodiment, the presently disclosed and/or claimed inventive concept(s) encompasses a method for preparing an aqueous lignin nanoparticle dispersion comprising heating and mixing a heterogeneous composition comprising at least one of lignin, derivatized lignin, and combinations thereof, and water, wherein at least one of the lignin and/or derivatized lignin is not water soluble in the continuous phase.

The presently disclosed and/or claimed inventive concept(s) also encompasses a lignin nanoparticle-polymer complex, wherein the lignin nanoparticle-polymer complex comprises a polymer and at least one of a lignin nanoparticle, derivatized lignin nanoparticle, and combinations thereof, wherein the lignin nanoparticle-polymer complex is formed by polymer-lignin association rather than chemical bonding. In one embodiment, the polymer-lignin association can be at least one of donor-acceptor bonding (i.e., pi-pi bond interaction), hydrogen bonding, polar-polar interaction, and hydrophobic interaction. It has been found that lignin nanoparticles, and likewise derivatized lignin nanoparticles, enhance such donor-acceptor interactions with the polymer in the lignin nanoparticle-polymer complex. By not relying on chemical bonds to form the lignin nanoparticle-polymer complex, the properties of the polymer will be imparted directly to the lignin nanoparticles, and then onto surfaces/interfaces treated with the lignin nanoparticle-polymer complex due to the enhanced adsorptivity of the lignin nanoparticle-polymer complex on such surfaces/interfaces.

The presently disclosed and/or claimed inventive concept(s) also encompasses a lignin nanoparticle-polymer complex dispersion comprising, consisting of, or consisting essentially of a lignin nanoparticle-polymer complex comprising the polymer and at least one of a lignin nanoparticle dispersion and/or a derivatized lignin nanoparticle dispersion, wherein the lignin nanoparticle-polymer complex dispersion comprises the lignin nanoparticle-polymer complex in the range of from about 0.01 to about 70 wt %, or from about 0.1 to 40 wt %, or from about 5 to about 40 wt %, or from about 15 to about 30 wt %, and a solvent in the range of from about 30 to about 99.99 wt %, or from about 60 to about 99.9 wt %, or from about 60 to 95 wt %, or from about 70 to about 85 wt %. In one embodiment, the solvent is water. In an alternative embodiment, the lignin nanoparticle-polymer complex is present in the range of from about 1 to about 30 wt %, wherein the active ingredients comprise at least one of a lignin nanoparticle and/or a derivatized lignin nanoparticle and a water dispersible and/or water soluble polymer. In one embodiment, the lignin nanoparticle dispersion and/or derivatized lignin nanoparticle dispersion (as described above) are added to the water dispersible and/or water soluble polymer at a weight ratio in the range of from about 0.1:99.9 to about 99.9:0.1 lignin nanoparticle dispersion to water dispersible and/or water soluble polymer, or in the range of from about 1:99 to about 99:1 lignin nanoparticle dispersion to water dispersible and/or water soluble polymer, or in the range of from about 5:95 to about 95:1, or from about 20:80 to about 80:20, or from about 1:5 to 5:1, or from about 0.1:99.9 to about 1:2, or from about 2.5:1 to about 20:1 lignin nanoparticle dispersion to water dispersible and/or water soluble polymer.

Additionally, if the water dispersible and/or water soluble polymer is hydrophilic and the lignin nanoparticles act in a hydrophobic capacity, or vice versa, the polymer-lignin nanoparticle complex turns into a nanoparticle surfactant, as defined above. A similar class of materials currently of academic interest is described in, for example, in B. J. Kim, Langmuir 23, 7804 (2007) and K. Larson-Smith and D. C. Pozzo, Langmuir 28, 11725, (2012), both of which are hereby incorporated by reference in their entirety. By attaching a hydrophilic polymer onto a hydrophobic surface through the interaction between lignin nanoparticles and the polymer, the surface will become more hydrophilic. Such surface hydrophilization can be adjusted to be water rinse-off or water rinse-resistant, depending on various factors such as the type of polymer, the bonding strength of lignin nanoparticles with the polymer, and the presence of amphiphilic species such as surfactants and polymeric surfactants.

The polymer-lignin association impacts the measured size of the lignin nanoparticles in the dispersion and can, therefore, be impacted through selection of the polymer and the relative concentration of the lignin nanoparticle dispersion added to the polymer.

In another embodiment, the lignin nanoparticle-polymer complex also comprises, consists of, or consists essentially of a cross-linking agent that stabilizes the size of the lignin nanoparticles. An example of such a chemical cross-linking process is disclosed in U.S. Pat. No. 4,957,557, for example U.S. Pat. No. 4,957,557 discloses, however, the use of formaldehyde, a hazardous chemical, as the cross-linking agent. In contrast to this prior art, the presently claimed and/or disclosed inventive concept(s) do not necessarily require hazardous chemicals, such as formaldehyde, for the cross-linking reaction to occur.

The water dispersible and/or water soluble polymer, capable of interacting with lignin to form a lignin nanoparticle-polymer complex, can be selected from the group consisting of a heterocyclic polymer, a water-soluble lignin derivative, a poly(alkylene oxide), a functionalized poly (alkylene oxide), polyvinyl alcohol, cellulose derivatives, polynaphthalene sulfonate, polysaccharide derivatives, copolymers containing the above listed polymer blocks or segments, and combinations thereof. In one embodiment, the water dispersible and/or water soluble polymer is a heterocyclic polymer. In particular, but without limitation, the polymer is a heterocyclic polymer selected from the group consisting of polyvinylpyrrolidone, polyvinylcaprolactam, polyvinylimidazole, polypyridine, polypyridine oxide, polypyridine carboxylate, copolymers of such, and combinations thereof. In an alternative embodiment, the water dispersible and/or water soluble polymer is a water-soluble lignin derivative. In particular, but without limitation, the water-soluble lignin is a lignosulfonate. In another embodiment, the water dispersible and/or water soluble polymer is a poly(alkylene oxide). In particular, but without limitation, the poly(alkylene oxide) is selected from the group consisting of poly(ethylene oxide), poly(propylene oxide), poly(butylenes oxide) and combinations thereof. Additionally, in one embodiment, the water dispersible polymer is a functionalized poly(alkylene oxide), wherein the functionalized poly(alkylene oxide) is a polyetheramine, specifically from the JEFFAMINE® polyetheramine family produced by Huntsman International LLC (The Woodlands, Tex.). In an additional alternative embodiment, the water dispersible and/or water soluble polymer is hydroxyethyl cellulose, methylcellulose, ethylcellulose and combinations thereof. In one embodiment, the water dispersible and/or water soluble polymer physically adsorbs to the lignin nanoparticles and/or derivatized lignin nanoparticles as described above.

In an alternative embodiment, the water dispersible and/or water soluble polymer can also be attached to the lignin nanoparticles through coordination bonds via metal ions, such as alkali earth elements, transition metals, namely $Fe^{3+}$, $Fe^{2+}$, $Al^{3+}$, $Zn^{2+}$, $Ca^{2+}$, $Mg^{2+}$, $Ti^{4+}$, and combinations thereof.

If required, any cross-linking agents known in the prior art can be applied to bind the water dispersible and/or water soluble polymer to the lignin nanoparticle and/or derivatized lignin nanoparticle prepared by using the methods described. Such cross-linking agents can be selected from the group consisting of a dialdehyde, polyaldehyde, dianhydride, polyanhydride, diisocyanate, polyisocyanate, diepoxide, polyepoxide, and combinations thereof. In one embodiment, the cross-linking agent is at least one of dialdehyde and polyaldehyde. In particular, but without limitation, the cross-linking agent is selected from the group consisting of glyoxal, glutaraldehyde, epichlorohydrin, and combinations thereof.

Figure 3:
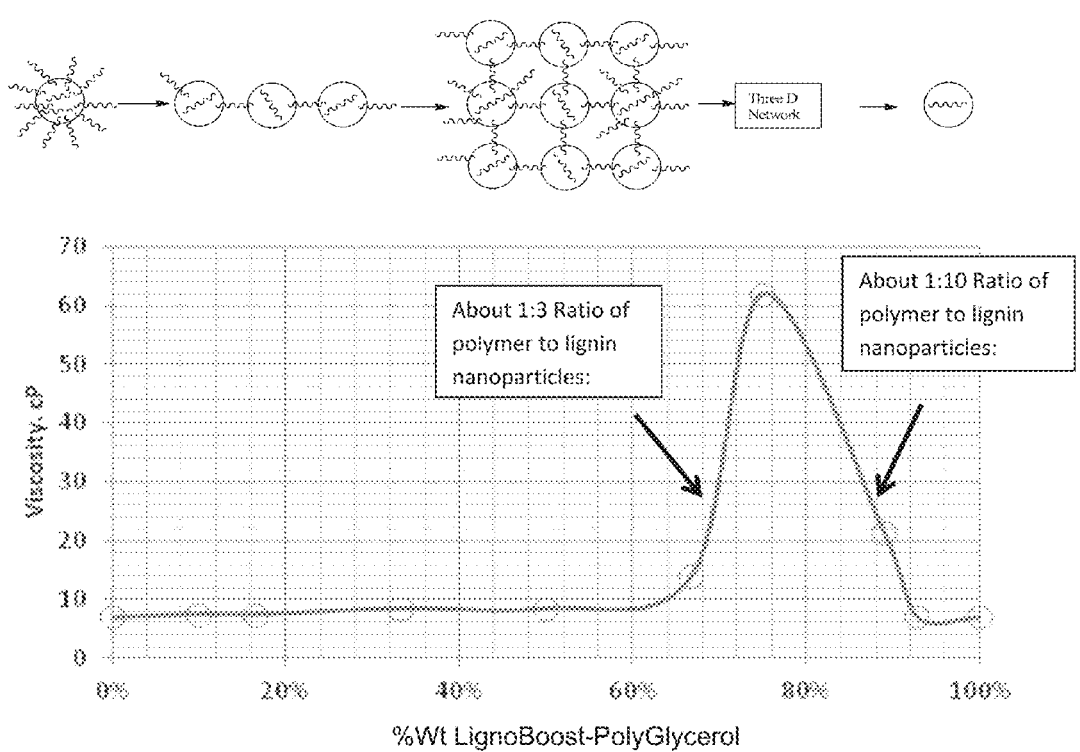
FIG. 3 is a graphical representation illustrating that, for one embodiment, at the indicated ratios of lignin nanoparticles to water dispersible and/or water soluble polymer, a viscosity maximum occurs demonstrating the formation of a lignin nanoparticle-polymer complex.

The presently disclosed and/or claimed inventive concept(s) also encompasses a method(s) for making the lignin nanoparticle-polymer complex in a dispersion (as described above) comprising, consisting of, or consisting essentially of the steps of: (i) combining at least one of a lignin nanoparticle dispersion (as described above), a derivatized lignin nanoparticle dispersion (as described above), and combinations thereof and an aqueous solution of a polymer (as described above), and (ii) mixing to form a lignin nanoparticle-polymer complex in a dispersion, wherein the lignin nanoparticle-polymer complex dispersion comprises the lignin nanoparticle-polymer complex in the range of about 0.01 to about 70 wt %, or from about 0.1 to about 40 wt %, from about 1 to about 30 wt %. The lignin nanoparticle-polymer complexes can be formed in the dispersion by adding lignin nanoparticles and/or derivatized lignin nanoparticles to the polymer solution at any ratio. If a network is required for any specific application, the optimum ratio of polymer to lignin ratio can be located by titrating the polymer solution with lignin nanoparticle dispersion while mixing until the maximum viscosity is reached permitting the formation of a network of the lignin nanoparticle-polymer complex as illustrated in FIG. 3. It is perceived that such a network will be especially effective for the deposition on and subsequent modification of surfaces by the lignin nanoparticle-polymer complex. For the purpose of stabilizing lignin nanoparticles from aggregation, a lower ratio of lignin to polymer than the one for network formation is preferred. In one embodiment, the lignin nanoparticle dispersion and/or derivatized lignin nanoparticle dispersion as described above are added to the polymer at a ratio in the range of from about 0.1:99.9 to 99.9:0.1 lignin nanoparticle dispersion to polymer, or in the range of from about 1:99 to about 99:1 lignin nanoparticle dispersion to polymer, or in the range of from about from about 5:95 to about 95:5, or from about 20:80 to about 80:20, or from about 1:5 to 5:1, or from about 0.1:99.9 to about 1:2, or from about 2.5:1 to about 20:1 lignin nanoparticle dispersion to polymer. In another embodiment, the critical regime, suggesting a proper ratio of lignin nanoparticle dispersion to polymer such as to form a lignin nanoparticle-polymer complex, can be indicated by an increase in viscosity of the composition.

A key component of the presently disclosed and/or claimed inventive concept(s) is that the dispersions of lignin nanoparticle, derivatized lignin nanoparticle, and lignin nanoparticle-polymer complexes described herein above have been found to have an enhanced affinity to surfaces, which are not limited by adsorption theories such as: (i) a distinctive hydrophilic-hydrophobic domains of anisotropic lignin nanoparticles, (ii) accessibility of hydrogen bonds, (iii) accessibility of coordination bonds, and (iv) reactivity of the stabilized/captured radicals inside the lignin nanoparticle core. The chemical reactive radical species could be generated during lignin isolation, processing or in contact with air. It is generally agreed that the dark color of lignin is partially attributed to the presence of radicals. Regardless of the perceived theory or mechanism, the dispersion of lignin nanoparticles, derivatized lignin nanoparticles, and lignin nanoparticle-polymer complexes described above have been found to demonstrate a strong surface affinity for both organic and inorganic materials, such as for example but without limitation, ceramic, vinyl, stainless steel, aluminum, laminate, glass, fabric, and combinations thereof, and impart rinse-resistant properties, e.g., hydrophilicity, onto such treated surfaces. "Surface affinity" is defined herein as having a good adhesion to surfaces that, for example but without limitation, results in the lignin nanoparticle dispersion, derivatized lignin nanoparticle dispersion, dispersions of lignin nanoparticle-polymer complex, and combinations thereof being able to withstand being rinsed off a surface with water once it has been applied. As used herein, the term "rinse resistant" and/or "rinse resistance" shall mean that the properties attributable to the lignin nanoparticles, derivatized lignin nanoparticles, and/or lignin nanoparticle-polymer complexes will remain for the treated surfaces even after rinsing the surfaces with water or other solvent.

Thus, the presently disclosed and/or claimed inventive concept(s) also encompasses a method of providing water-rinse-resistant properties to surfaces comprising the steps of (a) treating a surface by contacting the surface with at least one of a lignin nanoparticle dispersions, derivatized lignin nanoparticle dispersions, and/or dispersion of lignin nanoparticle-polymer complexes, and combinations thereof, wherein the concentrations of the lignin nanoparticles, derivatized lignin nanoparticles, lignin nanoparticle-polymer complexes, and/or combinations thereof are in the range of from about 0.01 to about 70 wt %, or from about 0.1 to about 50 wt %, or from about 10 to about 30 wt %, or from about 15 to about 25 wt %, or from about 0.01% to about 5%, or from about 0.1 w % to about 2%, or from about 0.2% to about 1%, and (b) rinsing the surface with water, and optionally (c) drying the treated surface. In one embodiment, the step of drying includes the process of air drying the treated surface. By air drying, oxidation is allowed to occur on the surface, curing the lignin nanoparticles or lignin nanoparticle-complex on the surface. Of course, other processes for drying a treated surface are known to those of ordinary skill in the art and are contemplated for use herein. In one embodiment, the at least one of lignin nanoparticle dispersion, derivatized lignin nanoparticle dispersion, and/or dispersion of lignin nanoparticle-polymer complex is diluted prior to treating the surface such that the concentrations of the lignin nanoparticles, derivatized lignin nanoparticles, lignin nanoparticle-polymer complexes, and/or combinations thereof are in a range of from about 0.01 to about 70 wt %, or from about 0.1 to about 50 wt %, or from about 10 to about 30 wt %, or from about 15 to about 25 wt %, or from about 0.01% to about 5%, or from about 0.1 w % to about 2%, or from about 0.2% to about 1%.

As such, the lignin dispersions, derivatized lignin dispersions, and dispersions of lignin nanoparticle-polymer complexes described herein are all suitable for functions such as, but not limited to, felt cleaning and conditioning, hard surface cleaning, for example but without limitation automobiles and countertops, and as rinse aids for dishes and laundry. In one embodiment, the dispersions of lignin nanoparticles and/or derivatized lignin nanoparticles and/or lignin nanoparticle-polymer complexes can impart properties comprising, for example but without limitation, hydrophilicity, hydrophobicity, antimicrobial, UV-protection, anti-oxidation and anti-soiling on a surface(s). In an alternative embodiment, the lignin nanoparticle-polymer complexes (as described above) can impart tunable properties comprising, for example but without limitation, hydrophilicity, hydrophobicity, antimicrobial, UV-protection, anti-oxidation and anti-soiling depending on the polymer that is used to form the lignin nanoparticle-polymer complex.

In one embodiment, the presently disclosed and/or claimed inventive concept(s) also encompasses a method of providing water-rinse-resistant hydrophilic properties to surfaces comprising the steps of (i) treating a surface by contacting the surface with at least one of the above-described dispersions of lignin nanoparticles, derivatized lignin nanoparticles, lignin nanoparticle-polymer complexes, and combinations thereof with water wherein the concentrations of the lignin nanoparticles, derivatized lignin nanoparticles, lignin nanoparticle-polymer complexes, or combinations are in the range of from about 5 to about 50 wt %, or from about 10 to about 30 wt %, or from about 15 to about 25 wt %, or from about 0.01 to about 5 wt %, or from about 0.1 to about 2 wt %, or about 0.2 to 1 wt %, and (ii) rinsing the surface with water, and optionally (ii) drying the treated surface. In one embodiment, the step of drying includes the process of air drying the treated surface. In one embodiment, the at least one of lignin nanoparticle dispersion, derivatized lignin nanoparticle dispersion, and/or dispersion of lignin nanoparticle-polymer complex is diluted prior to treating the surface.

In one embodiment, the concentration of the lignin nanoparticles, lignin nanoparticle derivatives, lignin nanoparticle-polymer complexes, and combinations thereof can be at any concentration deemed effective, optionally above 200 ppm active particles. In one embodiment, a concentration greater than about 10 ppm active particles is deemed effective. In an alternative embodiment, a concentration above 100 ppm active particles is deemed effective. In an alternative embodiment, surfactants can be added to the dispersions of lignin nanoparticles, derivatized lignin nanoparticles, lignin nanoparticle-polymer complexes, and combinations thereof to reduce the surface affinity of the particles and complexes in the above described dispersions. In another embodiment, the pH of the diluted dispersion of lignin nanoparticles can be lowered to about 2.5 and yet maintain, for example, hydrophilisation properties and exhibit surface affinity properties such as, but without limitation, surface wetting. However, it has been found that if the pH drops below a certain level, e.g., below about 2, the long term stability of the dispersion may be negatively impacted and the particles may no longer remain dispersed.

Alternatively, the dispersions of lignin nanoparticles, derivatized lignin nanoparticles, lignin nanoparticle-polymer complexes, and combinations thereof (as described above), can be used separately or jointly as additives in a wide variety of applications due to their amphiphilic polymer-like properties and water-rinse-resistant affinity to surfaces. For example, but without limitation, the dispersions of lignin nanoparticles, derivatized lignin nanoparticles, lignin nanoparticle-polymer complexes, and combinations thereof described herein can be used as emulsifiers, dispersants, non-surfactant based detergents, scale and corrosion inhibitors, compatibilizers for plastic and composite materials, coating primers, and coating additives, and can be used for felt and wire passivation and conditioning, hard-surface cleaning, hydrophilic coating, enhanced oil recovery, increased adhesion of adhesives, metal processing, encapsulation and controlled delivery, surface wetting, and anti-microbial and anti-soiling surfaces.

EXAMPLES

BioChoice™ (West, Montreal, QC) lignin isolated from black liquor and obtained from Domtar Paper Co. (West, Montreal, QC), which operates a LignoBoost® process originally developed by Innventia AB, Stockholm Sweden, was used in the following examples unless otherwise specified below or in the tables.

Overview of Analytic Equipment Used in Examples

Particle size characterizations were made using a ZetaPlus instrument from Brookhaven Instruments Corporation (Holtsvill, N.Y.) measuring samples comprising 0.01 wt % of solids in water at the following settings: Ref. Index Fluid=1.1330; Angle=90; Wavelength=658 nm; Run Duration=5 minutes (final data an average of five repeats); Ref. Index Real=1.600; and Dust Filter Setting=30.00.

Centrifuge separations of nanoparticle solutions were performed using an Eppendorf® Centrifuge 5430 from Eppendorf North America (Hauppauge, N.Y.) equipped with a FA-45-48-11 rotor at a fixed angle at 9000 rpm (RCF=8060×g), while using the inner row (radius of 8.9 cm). The centrifuge tubes used were Utrafree® Durapore PVDF membranes with polypropylene filter cup/filtrate collection tubes with a 0.5 mL capacity from EMD Millipore (Billerica, Mass.). The typical spin time was 90 minutes. For the centrifuge separations, the nanolignin dispersions were diluted to 5 weight percent solids. 6-8 tared centrifuge filter tubes containing 100 nm membrane filters were charged with the respective 5 weight percent dispersions and then centrifuged at 9000 rpm for 90 min. Weights of the total solution that passed through the membrane (filtrate) and the damp solid retained on the membrane (retentate) were determined by difference versus the tared empty tubes. The filtrate solutions were combined, an aliquot taken, weighed, dried in an oven (150 deg C., 60 min) and the solids content determined by weight difference. This was repeated with the retentate to determine retentate solids. The weight percent of the solids that passed through the filter and the percent that did not was then determined as follows: (Total weight filtrate)×(solids of filtrate)=weight of filtrate solids; (Total weight retentate)×(solids of retentate)=weight of retentate solids; [weight of filtrate solids/(weight of filtrate solids+weight of retentate solids)]×100=percent filtrate; [weight of retentate solids/(weight of filtrate solids+weight of retentate solids)]×100=percent retentate.

In assessing the stability of lignin nanoparticle dispersions, the dispersions were observed and were considered "stable" if they remained homogeneous and had no visible separation, settling, or precipitation after four days at ambient conditions.

Additionally, as used in the examples, "dry basis" is the weight remaining after heating at 150° C. for 60 minutes in an oven and "parts water" includes water coming in with lignin powder. Also, as used herein, "nanolignin" should be understood to be interchangeable with "lignin nanoparticles".

Differentiating a Lignin Solution from Lignin Nanoparticle Dispersions

Lignin solutions (separate molecules of lignin in solution) are well known and can be easily prepared by heating and mixing lignin in water at a pH of 9.5 or greater. After the solution is formed, the pH can be lowered to 7.5-9.0 and the lignin will remain in solution, the specific pH varies with the type and source of lignin. Lignin solutions may have "some" low level of lignin nanoparticles contained in them. For the purpose of the presently disclosed and/or claimed invention, we are differentiating a lignin nanoparticle dispersion from a lignin solution as follows:

A nanoparticle dispersion must meet the following criteria: (1) Less than 85 wt % of the lignin (by dry weight) passes through a 100 nm centrifuge filter when using a 5 wt % lignin (by dry weight) dispersion under the conditions previously described for the equipment for centrifuge separations; (2) A 0.01 weight percent lignin concentration results in an "Effective particle size" between 5 and 600 nm and a signal intensity greater than 85 kilocounts per second, as analyzed using the settings and particle size instrument as previously described regarding the particle size characterization section; and (3) the dispersion is stable—i.e., homogenous and does not separate for at least four days.

A lignin solution exists when substantially all lignin is solubilized means 85 weight percent or more of lignin by dry weight is in soluble form. A lignin solution can be identified by the following criteria: (1) Greater than 85 wt % of the lignin (by dry weight) passes through a 100 nm centrifuge filter when using a 5 wt % lignin (by dry weight) dispersion under the conditions described below for centrifuge separations; (2) a 0.01 weight percent concentration results in a signal intensity less than 85 kilocounts per second, as analyzed using the settings and particle size instrument described in the particle size characterization equipment.

Additionally, a situation can exist, as identified by one or more of the following tables where lignin can be added to water under certain conditions which cause the lignin to form neither a solution nor a dispersion due to the lignin's instability causing it to noticeably phase separate.

Samples 1-9 in Table 1 demonstrate the above-presented distinction between a solution of lignin and a dispersion of lignin nanoparticles, as presently disclosed and/or claimed, using samples having a 5 wt % concentration of lignin particles therein and a 100 nm filter under 8060×g force for 90 minutes, wherein "nm" means nanometers, "kcps" means kilocounts per second, and "ps" means particles size.

TABLE 1

| Sample | Effective PS (nm) | kcps 0.01 wt % | % of Dry Wt Filtrate | % of Dry Wt Permeate | % Solids in Particle Form | % Solids in Solution Form | Dispersion or Solution |
|---|---|---|---|---|---|---|---|
| 1 | 556 | 12 | 0% | 100% | <1% | >99% | Solution |
| 2 | 406 | 77 | 3% | 97% | 3% | 97% | Solution |
| 3 | 587 | 82 | 11% | 87% | 11% | 87% | Solution |
| 4 | 143 | 120 | 76% | 14% | 76% | 14% | Dispersion |
| 5 | 125 | 165 | 85% | 14% | 85% | 14% | Dispersion |
| 6 | 175 | 284 | 86% | 12% | 86% | 12% | Dispersion |
| 7 | 161 | 358 | 83% | 13% | 83% | 13% | Dispersion |
| 8 | 168 | 452 | 86% | 11% | 86% | 11% | Dispersion |
| 9 | 315 | 553 | 99% | 12% | 99% | 12% | Dispersion |

The data in Table 1 demonstrates that the yield of particles (percent of solids that are in particle form) correlates with the particle size signal intensity, in kilocounts per second (kcps). For definition purposes, a sample with a signal intensity less than 85 kcps for a 0.01 weight percent solution is considered a solution, and a sample with a signal intensity greater than 85 kcps for a 0.01 weight percent dispersion and an effective particle size of less than 600 nanometers is considered a nanoparticle dispersion.

It should be noted that the distinction between a solution and a dispersion, as defined above and illustrated in Table 1, will exist for any composition produced using the "general procedure" as set out below even in view of the many variables that can be modified therein. That is, despite which process is used to produce a lignin nanoparticle dispersion, the above-defined distinctions between a solution and dispersion will apply. For samples 1-9 in particular, however, the general procedure described below was used, wherein: (1) sample 1 used potassium hydroxide as the base, equipment set up "c", and the potassium hydroxide was added until the a final pH of 11.0; (2) sample 2 used potassium hydroxide as the base, equipment set up "c", and the potassium hydroxide was added until the a final pH of 9.9; (3) sample 3 was a commercial product Zalta™ DS26-330 lignin sulfonate from Solenis LLC (Wilmington, Del.) was used; (4) sample 4 used potassium hydroxide as the base, equipment set up "a", and the potassium hydroxide was added at a ratio of mol base per g dry lignin of 0.000853; (5) sample 5 used sodium hydroxide as the base, equipment set up "a", and the sodium hydroxide was added at a ratio of mol base per g dry lignin of 0.000833; (6) sample 6 used potassium carbonate as the base, equipment set up "c", and the potassium carbonate was added at a ratio of mol base per g dry lignin of 0.000694; (7) sample 7 used potassium carbonate as the base, equipment set up "a", and the potassium carbonate was added at a ratio of mol base per g dry lignin of 0.000588; (8) sample 8 used potassium carbonate as the base, equipment set up "c", and the potassium carbonate was added at a ratio of mol base per g dry lignin of 0.000641; (9) sample 9 used potassium carbonate as the base, equipment set up "c", and the potassium carbonate was added at a ratio of mol base per g dry lignin of 0.000694; wherein each sample was heated to 92° C. for 5 minutes.

Figure 4:
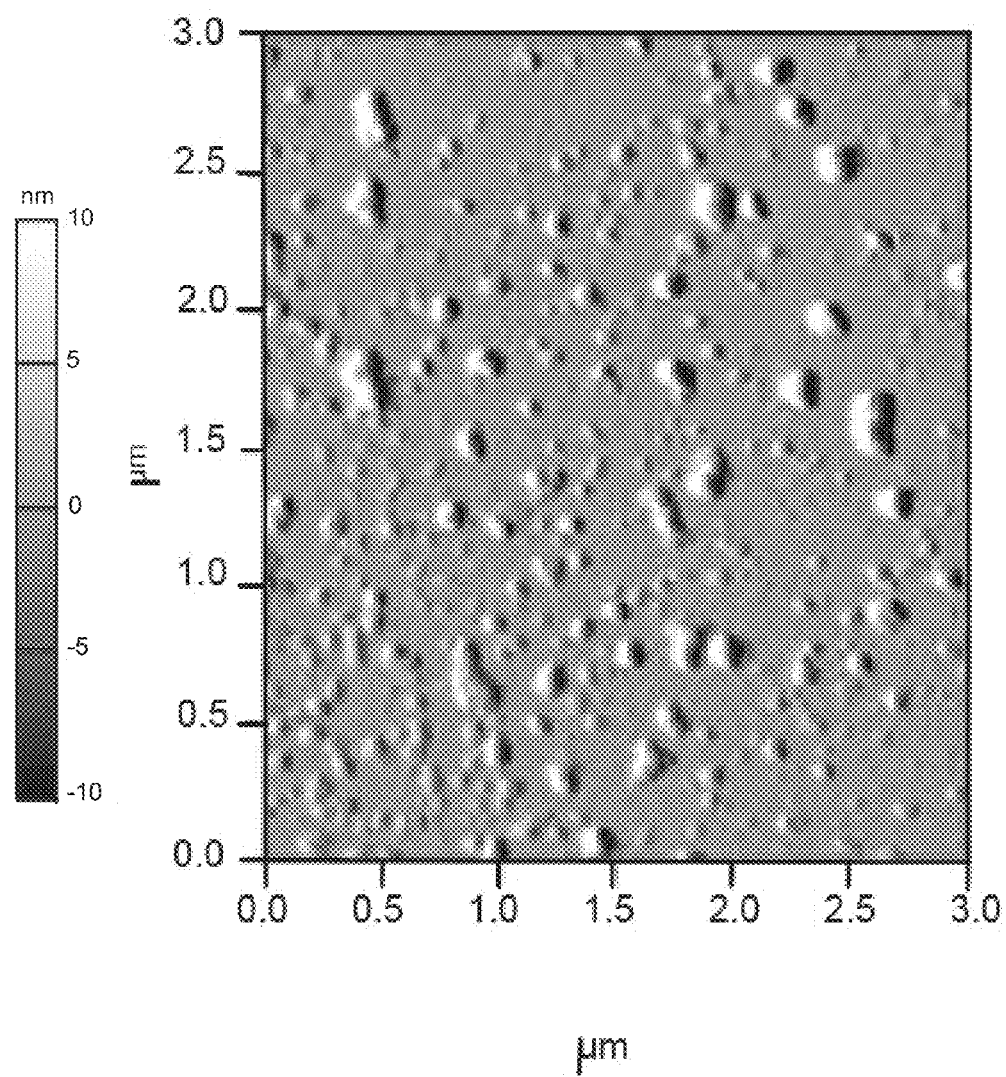
FIG. 4 is an image obtained with an AFM microscope of a lignin nanoparticle dispersion prepared from BioChoice™ lignin (Domtar Inc, West, Montreal, QC) isolated from black liquor by the LignoBoost® process (Innventia AB, Stockholm, Sweden) by neutralizing the BioChoice® lignin with potassium carbonate using the methods disclosed herein, wherein the lignin nanoparticle dispersion was diluted to 100 ppm active particles and cast on a mica surface.
Figure 5:
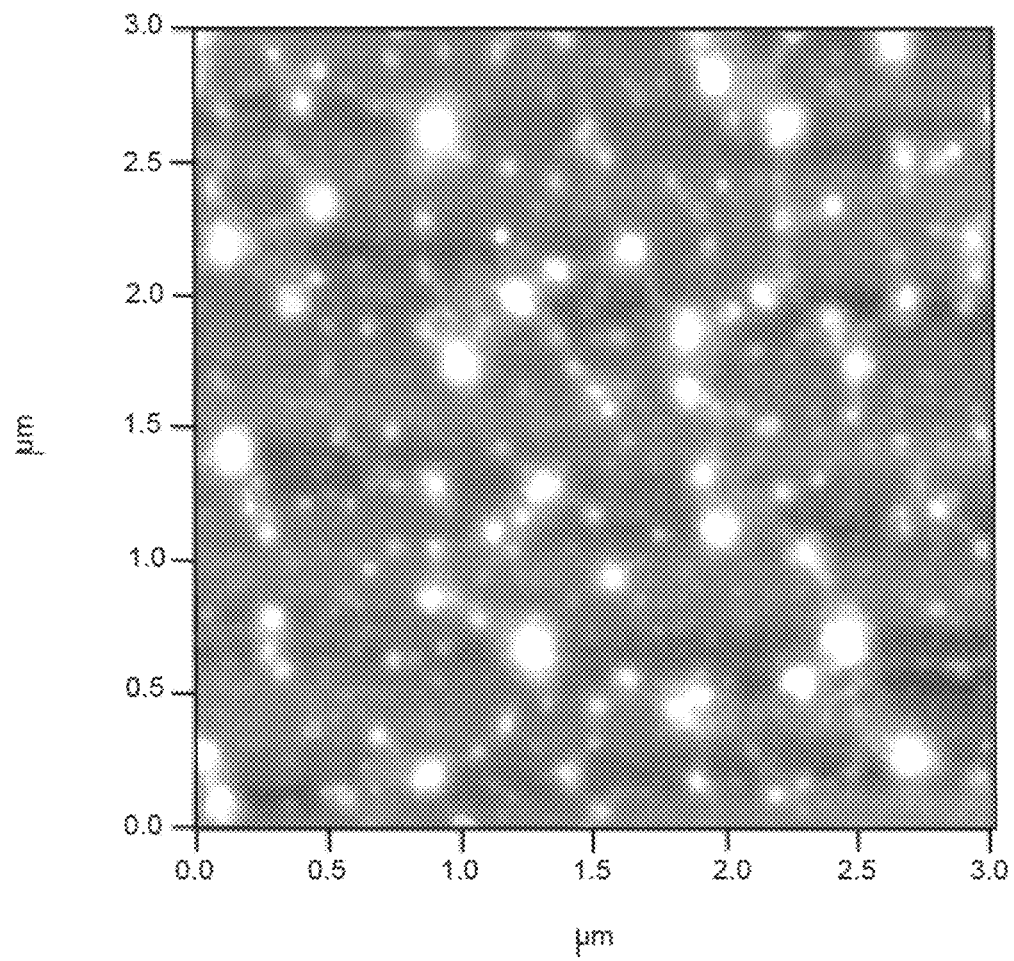
FIG. 5 is an image obtained with an AFM microscope of the lignin nanoparticle dispersion of FIG. 4 at a higher magnification.

Preparation and Results of Lignin Nanoparticle Dispersions for Microscopy Analysis and Analysis of the Modification of Surfaces to Provide Rinse-Resistant Wetting Properties Using Microscopy Analysis 60.23 parts BioChoice™ (Domtar Inc, West, Montreal, QC) kraft lignin of about 27% moisture were mixed with 2.98 parts potassium carbonate in 99.88 parts water. The mixture was heated to reflux, while stirring, within 15 minutes until a homogeneous liquid dispersion was obtained. While heating to reflux, it was observed that the mixture turned from a grayish suspension to viscous black liquid at around 80° C. indicating the initial formation of a lignin nanoparticle dispersion. After cooling to about 70° C., the dispersion was diluted with cold water. The dispersion was clear, free from particular material, having a pH of 8.3. The lignin nanoparticles were present in the dispersion at about 25 wt % as measured by moisture balance at 100° C. until a constant weight was reached. The particle sizes of the lignin nanoparticles were determined to be in the range of about 40 to 100 nm (see FIG. 4 and FIG. 5), wherein a diluted sample of the dispersion was cast on mica and measured using an AFM microscope.

The analysis of the modification of surfaces to provide rinse-resistant wetting properties using atomic force microscopy (AFM) using an Asylum Research MFP-3D atomic force microscope in AC mode using silicon cantilevers (AC240TS-R3, Asylum Research) with an average spring constant of approximately 2 N/m. The 2D height images with section analysis plot, amplitude images, and 3D height images are shown in FIGS. 6-9 as described below.

Figure 6:
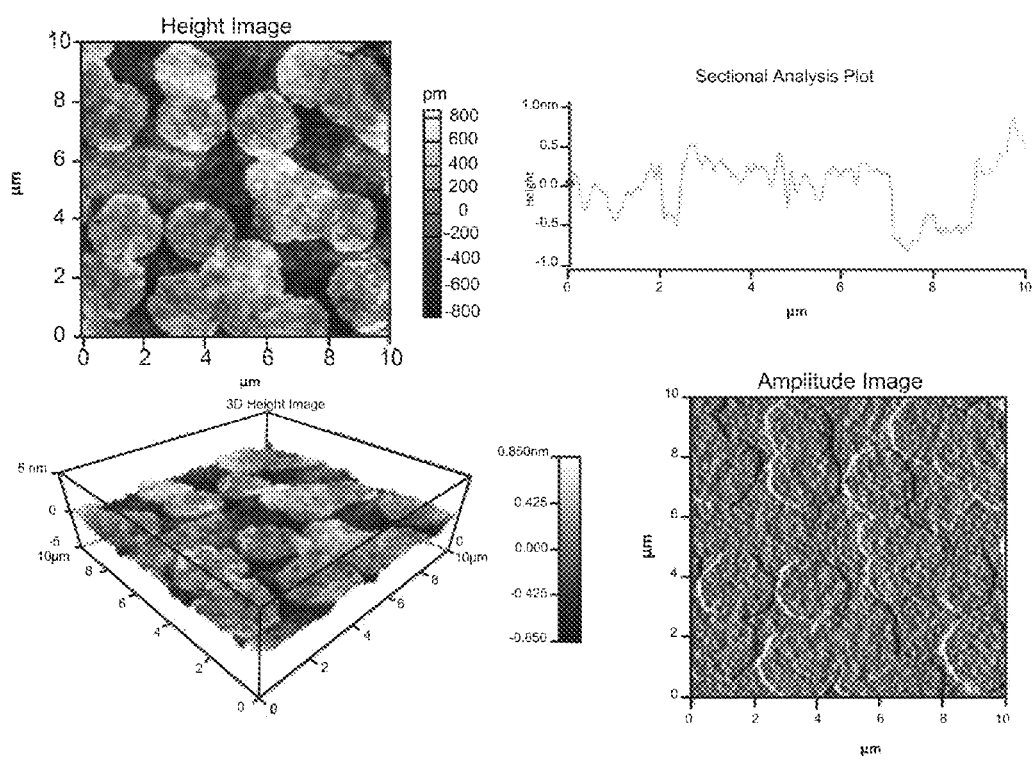
FIG. 6 is a series of images obtained with an AFM microscope of a glass covers slip.
Figure 7:
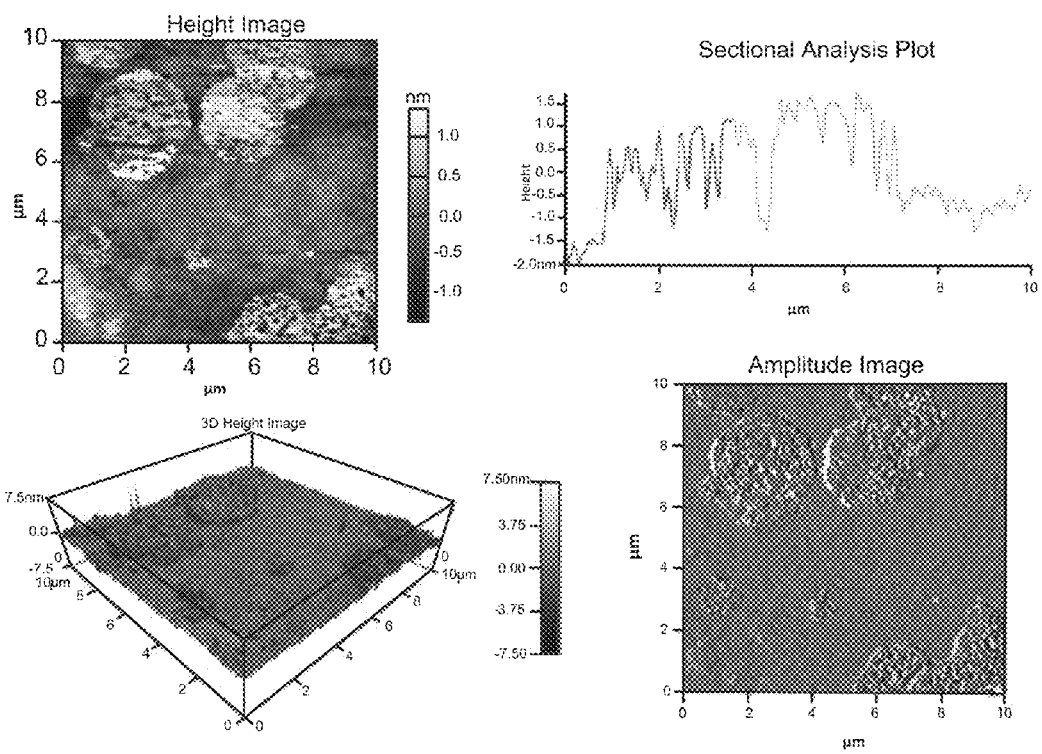
FIG. 7 is a series of images obtained with an AFM microscope of a tap-water rinsed glass cover slip.
Figure 8:
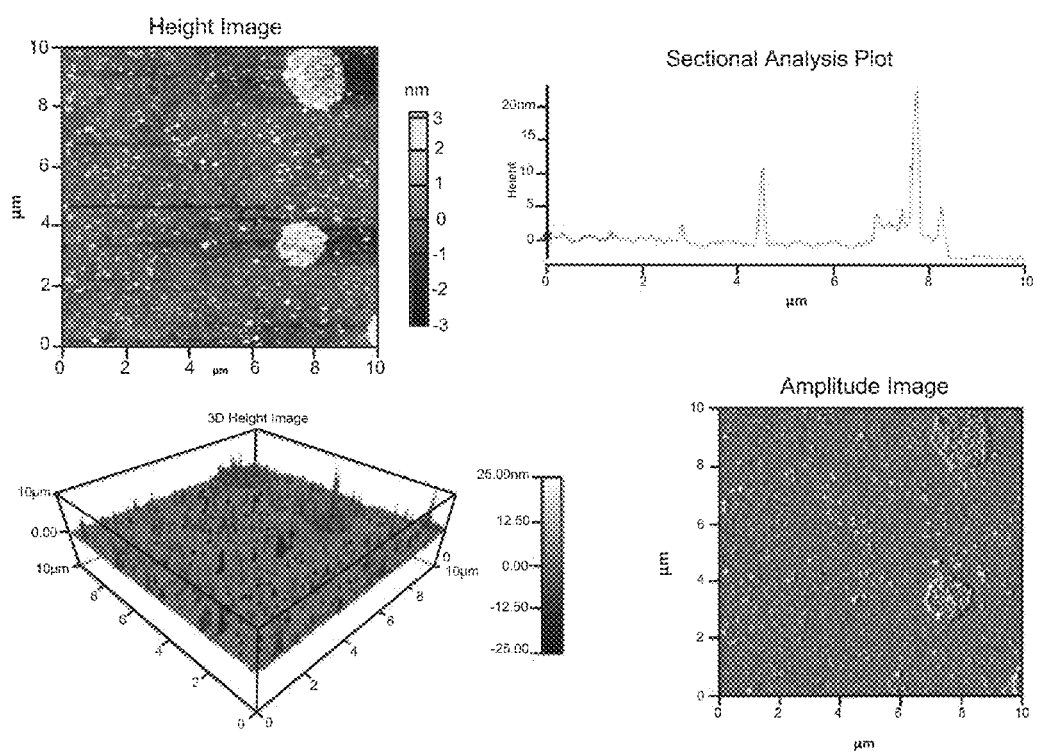
FIG. 8 is a series of images obtained with an AFM microscope of a lignin nanoparticle-treated glass cover slip.

Microscopic cover glass slip was used as the surface, whose AFM images were obtained as control before and after tap water-rinse and dried (FIGS. 6 and 7). No water film or water sheeting was observed with the cover slips although some of the flat and thin coatings were rinsed off, exposing the glass surface.

The treated surfaces were prepared by dipping cover slides into 0.1% lignin dispersion, as described above, prepared by diluting the above dispersion comprising 25 wt % liginin nanoparticles with municipal tap water. The slides were then immediately rinsed under running tap water for 30 seconds. A thin water film was observed on the treated surface before and after rinse, indicating the surface turned more hydrophilic. The rinsed slide was then air dried for AFM imaging. The images (FIG. 8) show lignin nanoparticles were attached to the surface after tap water rinse. Denser lignin nanoparticles attached to the residual hydrophobic coating were also observed.

Figure 9:
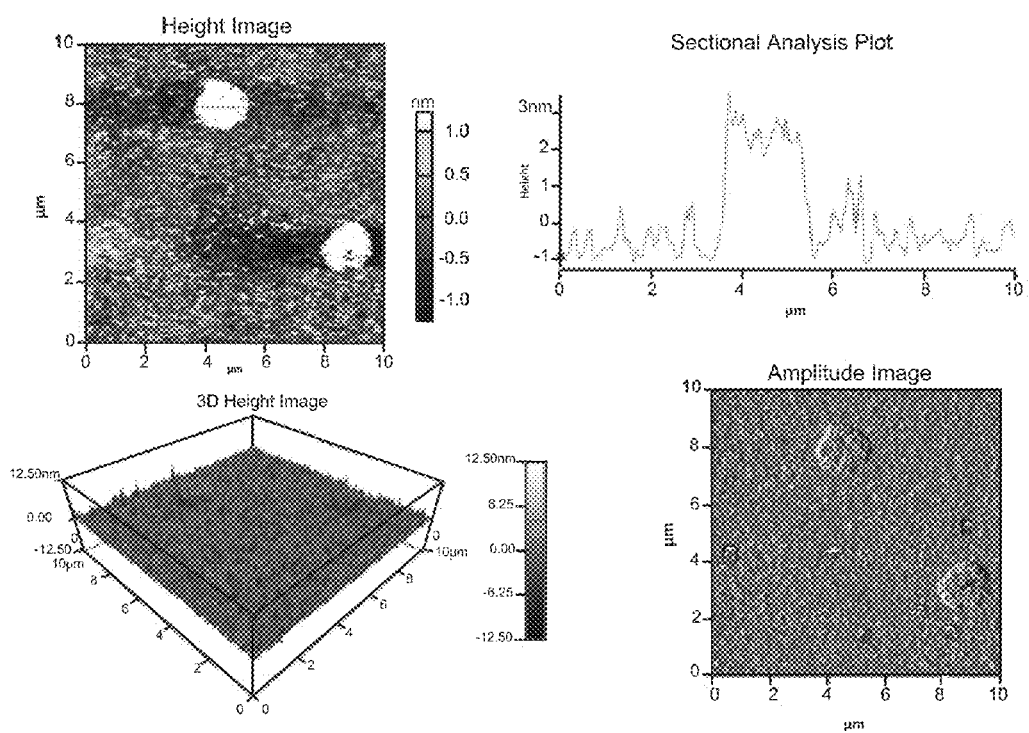
FIG. 9 is a series of images obtained with an AFM microscope of in-situ formed lignin nanoparticles on a glass cover slip.

Separately, a lignin solution was prepared from the same lignin source which was used to prepare lignin nanoparticle dispersion described above—i.e., BioChoice™ (Domtar Inc, West, Montreal, QC) kraft lignin. This solution was obtained by dissolving the lignin in alkaline water and then adjusting the pH carefully back to pH=9, at which lignin would precipitate if pH was further reduced. Such a solution was diluted at 0.1% with tap water and was used to treat glass cover slip in the same way as lignin nanoparticles. Surprisingly, lignin nanoparticles were not detected by dynamic light scattering, but the lignin solution demonstrated hydrophilisation of the hydrophobically coated glass cover slip and water sheeting was observed before and after tap water rinse. AFM showed smaller nanoparticles "sticking" on the rinsed cover slip and denser ones on the hydrophobic coating (FIG. 9). The particle size is in the range of less than a few nanometers.

Preparation and Results of Lignin Nanoparticle Dispersions Using Varying Process Conditions A number of experiments were carried out varying one or more processing conditions of a general procedure for the preparation of a lignin nanoparticle dispersion in order to determine the impact of variables like, for example, rate of temperature increase, maximum temperature, amount of base, type of base, etc., on the formation of a lignin nanoparticle dispersion as define and used herein. The general procedure used in each of the following samples in Tables 2-9 was as follows:

Five to forty-five parts (dry basis) of lignin powder was dispersed in 95-55 parts of 20-90° C. water with very good agitation for 5-20 min, which had a pH in a range from 2.0-5.5. A base, or a combination of bases, such as potassium carbonate, sodium carbonate, potassium hydroxide, sodium hydroxide, ammonium hydroxide, etc. was added to the dispersion after the lignin powder. The dispersion was then heated for an amount of time. Five to thirty-five degree Celsius water was then added, such that the resulting solids of the dispersion were between 5-40 wt % of the dispersion and thereafter allowed to cool to ambient temperature, typically over a period of 15-180 min.

Tables 2-9 identify the specific process conditions for each sample noting that the samples in Table 9 differ from the general procedure. The procedure of Table 9 differs by first preparing a 20 wt % lignin solution by heating the lignin and water to 90° C. while maintaining a pH of 10.0-12.0 with potassium hydroxide for 30 min (examples 88 and 93) and the remaining examples in Table 9 start with aliquots of these solution and the pH is gradually lowered with 10 wt % sulfuric acid while the sample is mixed vigorously at the temperature indicated in Table 9 to determine if nanodispersions could be obtained in this fashion.

Additionally, there were different equipment setups that were used for the various experimental samples presented in Tables 2-9, which are identified therein as either Equipment Setup "a", "b", "c", or "d". The following describes the various equipment set ups for each:

Equipment Set up "a": A 400 mL capacity cylindrical jacketed glass vessel (4.5 in high by 2.75 in diameter—not including jacket), equipped with an overhead stirrer fitted with a cowls blade for mixing at high shear or an anchor stirrer for moderate mixing, and thermocouple to monitor temperature. The sample was heated by using steam circulating through the jacket. When this set up was utilized, 22.5 g of lignin (dry basis) was utilized. The initial grams of water charged can be determined from the initial solids provided in Tables 2-9, the grams of base can be determined from the "moles base to grams lignin" ratio provided in the tables, and the grams of final dilution water added can be determined from the final solids given in the tables.

Equipment Set up "b": A 250 ml jacketed 3-neck glass round bottom flask fitted with an overhead stirrer with a half moon stirrer for mixing, a thermocouple to monitor temperature, and a reflux condenser to keep water from evaporating from the flask. The sample was heated by using hot oil circulating through the jacket. When this set up was utilized, 22.5 g of lignin (dry basis) was utilized. The initial grams of water charged can be determined from the initial solids provided in the tables, the grams of base can be determined from the "moles base to grams lignin" ratio provided in the tables, and the grams of final dilution water added can be determined from the final solids given in the tables.

Equipment Set up "c": A 1-L jacketed glass kettle type reactor fit with an overhead stirrer fitted with an overhead stirrer fitted with two A340 props for mixing, a thermocouple to monitor temperature, and a reflux condenser to keep water from evaporating from the vessel. The sample was heated by using hot oil circulating through the jacket. When this set up was utilized, 180 g of lignin (dry basis) was utilized. The initial grams of water charged can be determined from the initial solids provided in the tables, the grams of base can be determined from the "moles base to grams lignin" ratio provided in the tables, and the grams of final dilution water added can be determined from the final solids given in the tables.

Equipment Set up "d": A Mettler Toledo RC1e High Temperature calorimeter (Mettler-Toledo AutoChem Inc., Columbia, Md.) fit with a 1-L jacketed glass kettle reactor that was fit with an overhead stirrer fit with a ribbon style prop for mixing, a thermocouple to monitor temperature, and a reflux condenser to keep water from evaporating from the vessel. The sample was heated using hot oil circulating through the jacket. For cases when temperatures in excess of 99° C. were employed, the reactor was closed and run under pressure. When this set up was utilized, 184 g of lignin (dry basis) was utilized. The initial grams of water charged can be determined from the initial solids provided in the tables, the grams of base can be determined from the "moles base to grams lignin" ratio provided in the tables, and the grams of final dilution water added can be determined from the final solids given in the tables.

Table 2 demonstrates the impact of the top temperature when heating the base, lignin, and water on the formation of a stable lignin nanoparticle dispersion. This table demonstrates that a temperature greater than 65° C. is required to form a stable nanolignin dispersion of adequate yield. The lower end of the temperature range that will be successful in forming nanodispersions varies by lignin source (e.g. BioChoice™ lignin and Protobind 2400 lignin isolated from wheat straw (Green Value Enterprises LLC, Media, Pa.)) had different results when a temperature of 70-72° C. was used to form the nanodispersion). It is anticipated that lignin from an alternative source with a lower softening point would form nanolignin dispersions at lower temperatures and a lignin with a higher softening point would form nanolignin dispersions at temperatures greater than 99° C.

Table 3 demonstrates the impact of the rate of the temperature increase on forming stable nanolignin particle dispersions. This table demonstrates that the rate of temperature rise to reach the top temperature can vary significantly and nanolignin dispersions are still formed.

Table 4 demonstrates the impact of the top temperature on forming a stable nanolignin particle dispersion. This table demonstrates that the time held at top temperature can vary significantly and nanolignin dispersions are still formed.

Table 5 demonstrates the impact of the initial temperature on forming stable nanolignin particle dispersions. This table demonstrates that the initial temperature that the lignin is introduced can vary significantly and nanolignin dispersions are still formed.

Table 6 demonstrates the impact of the final pH and base type on forming stable nanolignin particle dispersions. This table demonstrates that the type of base used can vary widely including both inorganic and organic bases. The final pH generally varies from 7 to 8.8 to form stable nanolignin dispersions for most bases. A final pH of greater than 9.0 results in the formation of a solution rather than a dispersion, except when ammonium hydroxide is used as the base in which case a stable dispersion is uniquely formed up to a pH of 10.2.

Table 7 demonstrates the impact of the lignin concentration and dilution step on nanoparticle dispersion formation and quality. This table demonstrates that (a) better dispersions were formed (lower particle size, dispersion stability) when a dilution step was in place after the last heating step, and (b) Nanolignin dispersions are formed over a wide range of lignin concentrations, from 5-40 wt percent lignin. It should be noted that in some cases, the table demonstrates that the final solids were higher than the initial solids, which is due to some water evaporation during the process.

Table 8 demonstrates the impact of lignin source and type on forming stable nanolignin particle dispersions. This table demonstrates that the process works on different sources and types of lignin.

Table 9 demonstrates unsuccessful attempts to make nanolignin dispersions going from a high pH to a low pH.

TABLE 2

| Sample # | Base | Equipment Set Up | Ratio mol Base/ g Dry Lignin | Initial % Lignin Solids | Final % Total Solids | Final pH | Effective Particle Size (nm) | kcps (based on 0.01 wt % sol'n) | Nano-dispersion | Stability | Time to get to Top Temp (min) | Top Temp (deg C.) | Time at Top Temp (min) | Other |
|---|---|---|---|---|---|---|---|---|---|---|---|---|---|---|
| 10 | $K_2CO_3$ | a | 0.000533 | 27.0 | 27.0 | 7.6 | 1902 | 342 | No | Unstable Phase Separated | 2.5 | 25 | — | |
| 11 | $K_2CO_3$ | a | 0.000387 | 27.0 | 22.3 | 7.0 | 204 | 383 | Yes | Stable | 2.5 | 70 | 5 | Lignin isolated from wheat straw. Protobind 2400, 130 C. Softening point GreenValue Enterprises LLC |
| 14 | $K_2CO_3$ | b | 0.000533 | 27.0 | 24.7 | 7.7 | 1526 | 408 | No | Unstable Phase Separated | 2.5 | 72 | 15 | |
| 15 | $K_2CO_3$ | b | 0.000533 | 27.0 | 27.0 | 7.7 | 225 | 364 | Yes | Stable | 2.5 | 83 | 15 | |
| 16 | $K_2CO_3$ | a | 0.000533 | 27.0 | 22.3 | 7.9 | 141 | 397 | Yes | Stable | 2.5 | 92 | 5 | |
| 17 | $K_2CO_3$ | c | 0.000533 | 27.0 | 24.0 | 8.4 | 180 | 348 | Yes | Stable | 20 | 99 | 5 | |
| 18 | $K2CO_3$ | d | 0.000871 | 27.0 | 17.1 | 7.4 | 523 | 288 | Yes | Stable | 25 | 120 | 2 | Lignin isolated from wheat straw. Protobind 1000, 200 C. Softening point GreenValue Enterprises LLC |
| 19 | $K_2CO_3$ | d | 0.000387 | 27.0 | 21.1 | 7.4 | 7623 | 69 | No | Solution and Unstable | 25 | 120 | 2 | Lignin from hardwood from FP Innovations isolated using the LignoForce ™ process |
| 20 | $K_2CO_3$ | d | 0.000533 | 27.0 | 24.0 | 8.3 | 3954 | 263 | No | Unstable Phase Separated | 40 | 130 | 5 | |

TABLE 3

| Sample # | Base | Equipment Set Up | Ratio mol Base/ g Dry Lignin | Initial % Lignin Solids | Final % Total Solids | Final pH | Effective Particle Size (nm) | kcps (based on 0.01 wt % sol'n) | Stability | Brookfield Visc. (cps) | Time to get to Top Temp (min) | Top Temp (deg C.) | Time at Top Temp (min) |
|---|---|---|---|---|---|---|---|---|---|---|---|---|---|
| 21 | $K_2CO_3$ | a | 0.000533 | 32.0 | 22.3 | 7.9 | 141 | 397 | Stable | 14 | 2.5 | 92 | 5 |
| 22 | $K_2CO_3$ | b | 0.000533 | 32.0 | 22.5 | 7.9 | 156 | 364 | Stable | 15 | 20 | 99 | 5 |
| 23 | $K_2CO_3$ | b | 0.000533 | 32.0 | 23.7 | 8.0 | 170 | 522 | Stable | 27 | 120 | 93 | 5 |

TABLE 4

| Sample # | Base | Equipment Set Up | Ratio mol Base/ g Dry Lignin | Initial % Lignin Solids | Final % Total Solids | Final pH | Effective Particle Size (nm) | kcps (based on 0.01 wt % sol'n) | Stability | Brookfield Visc. (cps) | Time to get to Top Temp (min) | Top Temp (deg C.) | Time at Top Temp (min) |
|---|---|---|---|---|---|---|---|---|---|---|---|---|---|
| 24 | $K_2CO_3$ | c | 0.000533 | 29.0 | 25.5 | 7.4 | 199 | 433 | Stable | 78 | 20 | 93 | 5 |
| 25 | $K_2CO_3$ | c | 0.000533 | 30.0 | 25.0 | 8.1 | 230 | 444 | Stable | 16 | 20 | 92 | 60 |

TABLE 5

| Sample # | Base | Equipment Set Up | Ratio mol Base/ g Dry Lignin | Initial % Lignin Solids | Final % Total Solids | Final pH | Effective Particle Size (nm) | kcps (based on 0.01 wt % sol'n) | Stability | Brookfield Visc. (cps) | Time to get to Top Temp (min) | Top Temp (deg C.) | Time at Top Temp (min) | Temperature of Water when Lignin Added (deg C.) |
|---|---|---|---|---|---|---|---|---|---|---|---|---|---|---|
| 26 | $K_2CO_3$ | a | 0.000533 | 32.0 | 22.3 | 7.9 | 141 | 397 | Stable | 14 | 2.5 | 92 | 5 | 22 |
| 27 | $K_2CO_3$ | a | 0.000533 | 32.0 | 23.3 | 8.4 | 123 | 484 | Stable | 29 | 2.5 | 93 | 5 | 60 |
| 28 | $K_2CO_3$ | d | 0.000485 | 27.0 | 22.0 | 8.2 | 171 | 371 | Stable | 13 | 25 | 93 | 5 | 70 |

TABLE 6

| Sample # | Base | Equipment Set Up | Ratio mol Base/ g Dry Lignin | Initial % Lignin Solids | Final % Total Solids | Final pH | Effective Particle Size (nm) | kcps (based on 0.01 wt % sol'n) | Dispersion or Solution | Stability | Brookfield Visc. (cps) | Time to get to Top Temp (min) | Top Temp (deg C.) | Time at Top Temp (min) |
|---|---|---|---|---|---|---|---|---|---|---|---|---|---|---|
| 29 | $NH_4OH$ | a | 0.001601 | 27.0 | 22.3 | 9.4 | 179 | 355 | Dispersion | Stable | 21 | 2.5 | 92 | 5 |
| 30 | $NH_4OH$ | a | 0.002269 | 27.0 | 22.1 | 9.5 | 179 | 350 | Dispersion | Stable | 483 | 2.5 | 92 | 5 |
| 31 | $NH_4OH$ | a | 0.003203 | 27.0 | 21.6 | 10.2 | 208 | 329 | Dispersion | Stable | 79 | 2.5 | 92 | 5 |
| 32 | $N(C_2H_4OH)_3$ | a | 0.005338 | 27.0 | 22.0 | 8.6 | 310 | 304 | Dispersion | Stable | >100,000 | 2.5 | 92 | 5 |
| 33 | $N(C_2H_4OH)_3$ | a | 0.006406 | 27.0 | 22.3 | 9.2 | 322 | 42 | Solution | Stable | 1812 | 2.5 | 92 | 5 |
| 34 | KOH | b | 0.000800 | 32.0 | 19.5 | 7.0 | 139 | 287 | Dispersion | Stable | 10 | 20 | 99 | 5 |
| 35 | KOH | a | 0.000773 | 32.0 | 22.6 | 7.6 | 249 | 487 | Dispersion | Stable | 40 | 2.5 | 92 | 5 |
| 36 | KOH | a | 0.000822 | 32.0 | 24.4 | 8.0 | 146 | 360 | Dispersion | Stable | 54 | 2.5 | 92 | 5 |
| 37 | KOH | a | 0.000969 | 32.0 | 22.5 | 8.7 | 88 | 186 | Dispersion | Stable | 19 | 2.5 | 92 | 5 |
| 38 | KOH | a | 0.001258 | 32.0 | 25.3 | 9.1 | 97 | 39 | Solution | Stable | 12 | 2.5 | 92 | 5 |
| 39 | KOH | a | 0.003100 | 27.0 | 27.0 | 11.5 | 425 | 10 | Solution | Stable | 4318 | 20 | 75 | 30 |
| 40 | NaOH | a | 0.000588 | 32.0 | 24.0 | 6.3 | 1104 | 402 | Neither | Unstable | 48 | 2.5 | 92 | 5 |
| 41 | NaOH | a | 0.000833 | 32.0 | 19.9 | 7.1 | 105 | 311 | Dispersion | Stable | 10 | 2.5 | 92 | 5 |
| 42 | NaOH | a | 0.000686 | 32.0 | 23.2 | 7.3 | 119 | 478 | Dispersion | Stable | 39 | 2.5 | 92 | 5 |
| 43 | $Na_2CO_3$ | c | 0.000587 | 27.0 | 24.0 | 8.4 | 180 | 348 | Dispersion | Stable | 25 | 20 | 92 | 5 |
| 44 | $K_2CO_3$ | a | 0.000375 | 32.0 | 25.2 | 6.1 | 2266 | 365 | Neither | Unstable | 64 | 2.5 | 92 | 5 |
| 45 | $K_2CO_3$ | c | 0.000587 | 27.0 | 25.5 | 7.4 | 199 | 433 | Dispersion | Stable | 78 | 20 | 92 | 60 |
| 46 | $K_2CO_3$ | a | 0.000533 | 27.0 | 22.3 | 7.9 | 141 | 397 | Dispersion | Stable | 14 | 2.5 | 92 | 5 |
| 47 | $K_2CO_3$ | c | 0.000533 | 27.0 | 24.0 | 8.4 | 180 | 348 | Dispersion | Stable | 22 | 20 | 99 | 5 |
| 48 | $K_2CO_3$ | c | 0.000694 | 27.0 | 25.0 | 8.5 | 199 | 487 | Dispersion | Stable | 148 | 20 | 92 | 60 |
| 49 | $Ca(OH)_2$ | a | 0.000534 | 32.0 | 25.6 | 7.0 | 9509 | 1100 | Neither | Unstable | Separated | 2.5 | 92 | 5 |
| 50 | $Ca(OH)_2$ | a | 0.001069 | 32.0 | 24.6 | 8.7 | 5246 | 432 | Neither | Unstable | Separated | 2.5 | 92 | 5 |
| 51 | $Ca(OH)_2$ | a | 0.001069 | 32.0 | 12.5 | 9.1 | 2587 | 405 | Neither | Unstable | Separated | 2.5 | 92 | 5 |
| 52 | $Ca(OH)_2$ | a | 0.002422 | 32.0 | 24.2 | 10.6 | 1262 | 527 | Neither | Unstable | Separated | 2.5 | 92 | 5 |

TABLE 7

| Sample # | Base | Equipment Set Up | Ratio mol Base/ g Dry Lignin | Initial % Lignin Solids | Final % Total Solids | Dilution Step After Heating | Final pH | Effective Particle Size (nm) | kcps (based on 0.01 wt % sol'n) | Nano-dispersion | Stability | Brookfield Visc. (cps) | Time to get to Top Temp (min) | Top Temp (deg C.) | Time at Top Temp (min) |
|---|---|---|---|---|---|---|---|---|---|---|---|---|---|---|---|
| 53 | $K_2CO_3$ | a | 0.00053 | 5.0 | 5.4 | No | 8.0 | 1710 | 316 | No | Unstable (sediment formed) | 5 | 2.5 | 93 | 5 |
| 54 | $K_2CO_3$ | a | 0.00053 | 10.0 | 10.0 | No | 8.0 | 1281 | 469 | No | Unstable phase separation | 8 | 2.5 | 93 | 5 |

TABLE 7-continued

| Sample # | Base | Equipment Set Up | Ratio mol Base/ g Dry Lignin | Initial % Lignin Solids | Final % Total Solids | Dilution Step After Heating | Final pH | Effective Particle Size (nm) | kcps (based on 0.01 wt % sol'n) | Nano-dispersion | Stability | Brookfield Visc. (cps) | Time to get to Top Temp (min) | Top Temp (deg C.) | Time at Top Temp (min) |
|---|---|---|---|---|---|---|---|---|---|---|---|---|---|---|---|
| 55 | K$_2$CO$_3$ | a | 0.00053 | 15.0 | 15.3 | No | 8.3 | 561 | 280 | yes | Stable | 11 | 2.5 | 93 | 5 |
| 56 | K$_2$CO$_3$ | a | 0.00053 | 20.0 | 20.2 | No | 8.3 | 393 | 450 | yes | Stable | 18 | 2.5 | 93 | 5 |
| 57 | K$_2$CO$_3$ | a | 0.00053 | 25.0 | 25.4 | No | 8.3 | 236 | 294 | yes | Stable | >100,000 | 2.5 | 93 | 5 |
| 58 | | | | | | | | | | | | | | | |
| 59 | K$_2$CO$_3$ | a | 0.00058 | 5.0 | 3.2 | Yes | 7.7 | 1564 | 543 | No | Unstable (sediment formed) | 2 | 2.5 | 93 | 20 |
| 60 | K$_2$CO$_3$ | a | 0.00053 | 5.0 | 3.8 | Yes | 8.2 | 1407 | 661 | No | Unstable (sediment formed) | 3 | 2.5 | 93 | 5 |
| 61 | K$_2$CO$_3$ | a | 0.00053 | 10.0 | 7.2 | Yes | 8.1 | 241 | 404 | yes | stable | 6 | 2.5 | 93 | 5 |
| 62 | K$_2$CO$_3$ | a | 0.00053 | 15.0 | 11.1 | Yes | 8.1 | 234 | 343 | yes | stable | 9 | 2.5 | 93 | 5 |
| 63 | K$_2$CO$_3$ | a | 0.00053 | 20.0 | 16.8 | Yes | 8.3 | 220 | 280 | yes | stable | 13 | 2.5 | 93 | 5 |
| 64 | K$_2$CO$_3$ | a | 0.00053 | 25.0 | 22.2 | Yes | 8.3 | 118 | 437 | yes | stable | 18 | 2.5 | 93 | 5 |
| 65 | K$_2$CO$_3$ | a | 0.00053 | 35.0 | 23.2 | Yes | 8.3 | 113 | 470 | yes | stable | 16 | 2.5 | 93 | 5 |
| 66 | K$_2$CO$_3$ | a | 0.00053 | 40.0 | 22.9 | Yes | 8.0 | 382 | 371 | yes | stable | 24 | 2.5 | 93 | 5 |

TABLE 8

| Sample # | Base | Equipment Set Up | Ratio mol Base/ g Dry Lignin | Initial % Lignin Solids | Final % Total Solids | Final pH | Effective Particle Size (nm) | kcps (based on 0.01 wt % sol'n) | Stability | Brookfield Visc. (cps) | Time to get to Top Temp (min) | Top Temp (deg C.) | Time at Top Temp (min) | Lignin Source |
|---|---|---|---|---|---|---|---|---|---|---|---|---|---|---|
| 67 | K$_2$CO$_3$ | d | 0.000871 | 27.0 | 17.1 | 7.4 | 523 | 288 | Stable | 35 | 25 | 120 | 2 | Lignin isolated from wheat straw. Proto-bind 1000, 200 C. Softening point GreenValue Enterprises LLC |
| 68 | K$_2$CO$_3$ | d | 0.000435 | 27.0 | 21.1 | 6.7 | 1601 | 354 | Unstable Separated | 8.7 | 25 | 120 | 2 | |
| 69 | K$_2$CO$_3$ | a | 0.000969 | 27.0 | 22.1 | 8.8 | 339 | 320 | Stable | 16 | 2.5 | 92 | 5 | |
| 70 | K$_2$CO$_3$ | a | 0.000387 | 27.0 | 22.3 | 7.0 | 204 | 383 | Stable | 4 | 2.5 | 70 | 5 | Lignin isolated from wheat straw. Protobind 2400, 130 C. Softening point GreenValue Enterprises LLC |
| 71 | K$_2$CO$_3$ | a | 0.000435 | 27.0 | 22.3 | 7.3 | 180 | 382 | Stable | 456 | 2.5 | 92 | 5 | |
| 72 | K$_2$CO$_3$ | a | 0.000485 | 27.0 | 22.1 | 7.3 | 270 | 441 | Stable | 15 | 2.5 | 92 | 5 | |
| 73 | K$_2$CO$_3$ | a | 0.000581 | 27.0 | 22.3 | 9.1 | 118 | 75 | Solution | 74 | 2.5 | 92 | 5 | |
| 74 | K$_2$CO$_3$ | d | 0.000387 | 27.0 | 21.1 | 7.4 | 7623 | 69 | Unstable Solution | 21 | 25 | 120 | 2 | Lignin from hardwood from FP Innovations isolated using LignoForce™ process |
| 75 | K$_2$CO$_3$ | d | 0.000435 | 27.0 | 17.8 | 8.3 | 1208 | 171 | Unstable Separated | 7.2 | 25 | 130 | 2 | |
| 76 | K$_2$CO$_3$ | d | 0.000485 | 27.0 | 22.7 | 9.0 | 3306 | 4 | Unstable Solution | 9 | 45 | 135 | 20 | |
| 77 | K$_2$CO$_3$ | a | 0.000435 | 27.0 | 23.3 | 8.0 | 270 | 352 | Stable | 2328 | 2.5 | 92 | 5 | Lignin from softwood trees from FP Innovations isolated using the LignoForce™ process |
| 78 | K$_2$CO$_3$ | a | 0.000459 | 32.0 | 26.6 | 8.6 | 91 | 222 | Stable | 248 | 2.5 | 92 | 5 | |
| 79 | K$_2$CO$_3$ | a | 0.000485 | 32.0 | 18.0 | 8.7 | 161 | 261 | Stable | 96 | 2.5 | 92 | 5 | |
| 80 | K$_2$CO$_3$ | c | 0.000587 | 27.0 | 25.5 | 7.4 | 199 | 433 | Stable | 78 | 20 | 92 | 60 | Domtar BioChoice™ lot 10 from softwood trees |
| 81 | K$_2$CO$_3$ | a | 0.000533 | 27.0 | 22.3 | 7.9 | 141 | 397 | Stable | 14 | 2.5 | 92 | 5 | |
| 82 | K$_2$CO$_3$ | c | 0.000533 | 27.0 | 24.0 | 8.4 | 180 | 348 | Stable | 22 | 20 | 99 | 5 | |

TABLE 8-continued

| Sample # | Base | Equipment Set Up | Ratio mol Base/g Dry Lignin | Initial % Lignin Solids | Final % Total Solids | Final pH | Effective Particle Size (nm) | kcps (based on 0.01 wt % sol'n) | Stability | Brookfield Visc. (cps) | Time to get to Top Temp (min) | Top Temp (deg C.) | Time at Top Temp (min) | Lignin Source |
|---|---|---|---|---|---|---|---|---|---|---|---|---|---|---|
| 83 | K₂CO₃ | c | 0.000694 | 27.0 | 25.0 | 8.5 | 199 | 487 | Stable | 148 | 20 | 92 | 60 | isolated by LignoBoost ™ process |
| 84 | K₂CO₃ | a | 0.000338 | 32.0 | 23.4 | 7.4 | 478 | 414 | Stable | 48 | 2.5 | 92 | 5 | Domtar |
| 85 | K₂CO₃ | a | 0.000387 | 32.0 | 23.5 | 7.7 | 154 | 323 | Stable | 42 | 2.5 | 92 | 5 | BioChoice lot |
| 86 | K₂CO₃ | a | 0.000436 | 27.0 | 23.1 | 7.7 | 181 | 391 | Stable | 54 | 2.5 | 92 | 5 | 111 from |
| 87 | K₂CO₃ | a | 0.000485 | 32.0 | 23.1 | 8.4 | 98 | 344 | Stable | 147 | 2.5 | 92 | 5 | softwood trees isolated by LignoBoost process |

TABLE 9

| Sample # | Initial Lignin Solids % | Final % Total Solids | Equipment Set Up | Initial pH | Final pH | Effective Particle Size (nm) | kcps (based on 0.01 wt % sol'n) | Nanolignin Dispersion or Solution | Stability | Brookfield Visc. (cps) | Time to get to Top Temp (min) | Top Temp (deg C.) | Time at Top Temp (min) | Comments |
|---|---|---|---|---|---|---|---|---|---|---|---|---|---|---|
| 88 | 27 | 27 | c | 11.9 | 11.9 | 443 | 11 | Solution | Stable | 3981 | NA | 75 | 30 | A solution of lignin was prepared by heating a 27% solids mixture of lignin powder at a pH of 11.5-12 (adjusted using potassium hydroxide) and allowed to cool. The intensity of a 0.01 wt % aliquot produced a signal intensity of 10-11 kilocounts per second, which is considered a solution per the centrifuge filtering experiment described earlier. |
| 89 | 10 | 8.3 | a | 11.9 | 5.5 | 4289 | 478 | Neither | unstable, separated | 1.5 | NA | 90 | NA | Aliquots of the lignin solution were heated to 90 deg C. and the pH was gradually adjusted down using dilute sulfuric acid while being stirred vigorously with a Cowls blade, then allowed to cool. Regardless of the pH endpoint, no nanodispersions were formed. |
| 90 | 10 | 8.5 | a | 11.9 | 5.7 | 4781 | 458 | Neither | unstable, separated | 2.2 | NA | 90 | NA | |
| 91 | 20 | 16.5 | a | 11.9 | 5.5 | 3161 | 387 | Neither | unstable, separated | 5.7 | NA | 90 | NA | |
| 92 | 20 | 14.9 | a | 11.9 | 7.5 | 3990 | 579 | Neither | unstable, separated | 4.9 | NA | 90 | NA | |
| 93 | 27 | 27 | c | 11.5 | 11.5 | 425 | 10 | Solution | Stable | 4318 | NA | 75 | 30 | A solution of lignin was prepared by heating a 27% solids mixture of lignin powder at a pH of 11.5-12 (adjusted using potassium hydroxide) and allowed to cool. The intensity |

TABLE 9-continued

| Sample # | Initial Lignin Solids % | Final % Total Solids | Equipment Set Up | Initial pH | Final pH | Effective Particle Size (nm) | kcps (based on 0.01 wt % sol'n) | Nanolignin Dispersion or Solution | Stability | Brookfield Visc. (cps) | Time to get to Top Temp (min) | Top Temp (deg C.) | Time at Top Temp (min) | Comments |
|---|---|---|---|---|---|---|---|---|---|---|---|---|---|---|
| | | | | | | | | | | | | | | of a 0.01 wt % aliquot produced a signal intensity of 10-11 kilocounts per second, which is considered a solution per the centrifuge filtering experiment described earlier. |
| 94 | 5 | 5.11 | a | 11.5 | 7.5 | 141 | 14 | Solution | Stable | 2.1 | 2.5 | 93 | 15 | An aliquot of the 27% solids Lignin solution was diluted to 5%. The pH was adjusted down at ambient temperature using 2% sulfuric acid, then heated to 93 C. for 15 min, and allowed to cool. |
| 95 | 5 | 5.44 | a | 11.5 | 7.5 | 53 | 17 | Solution | Stable | 1.9 | 2.5 | 93 | 15 | Aa aliquot of the 27% solids Lignin solution was diluted to 5% and heated to 93 C. The pH was adjusted down using 2% sulfuric acid, then held at 93 C. for 15 min before cooling. |
| 96 | 15 | 11.03 | a | 11.5 | 7.6 | 39 | 33 | Solution | Stable | 6.2 | 2.5 | 93 | 15 | An aliquot of the 27% solids Lignin solution was diluted to 15%. The pH was adjusted down using 2% sulfuric acid, then heated to 93 C. for 15 min before cooling. Note: additional DI water was added while heating to 93 C. due to poor mixing as a result of high viscosity. |

Derivatizing and Thereafter Dispersing Lignin Nanoparticles in Water

Derivatized lignin nanoparticle dispersions were prepared using two different ratios of lignin and glycerol carbonate, referred to herein as Examples A and B.

Figure 10:
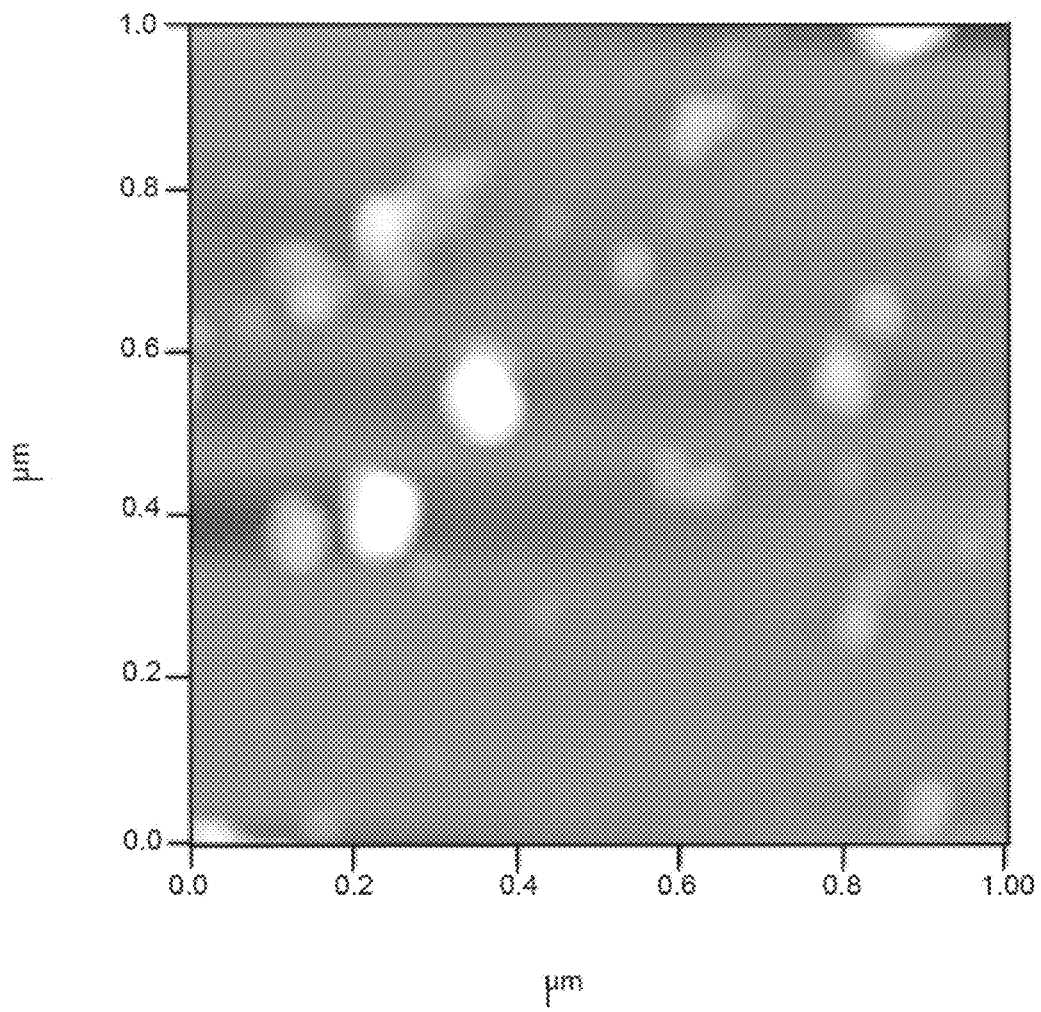
FIG. 10 is an image obtained with an AFM microscope of a lignin nanoparticle dispersion prepared by both derivatizing BioChoice™ lignin (Domtar Inc, West, Montreal, QC) with glycerol carbonate and neutralizing the BioChoice™ lignin (Domtar Inc, West, Montreal, QC) with potassium carbonate using the methods disclosed herein, wherein the lignin nanoparticle dispersion was diluted to 100 ppm active particles and cast on a mica surface.

For Example A, 60 parts BioChoice™ (Domtar Inc, West, Montreal, QC) kraft lignin of about 27% moisture content were mixed with 30 parts glycerol carbonate and 3 parts potassium carbonate. For Example B, 60 parts lignin nanoparticles were mixed with 60 parts glycerol carbonate and 3 parts potassium carbonate. Both mixtures were vacuum dried to remove any residual water while mixing and then heated to a temperature of approximately 160° C. for approximately 20 minutes and then cooled to 120° C. A homogeneous viscous liquid was observed. After cooling to 120° C., 98 parts water were mixed with the reaction product. The mixture was vigorously stirred and refluxed until a homogeneous liquid dispersion was obtained. For both Examples A and B, the derivatized lignin nanoparticles were present in the dispersion at about 37 wt % as measured by moisture balance at 100° C. until a constant weight was reached. The particle sizes of the lignin nanoparticles were determined to be in the range of about 30 to 100 nm (see FIG. 10), as measured by an AFM microscope in a similar manner described in previous example. Additionally, the dispersions appeared clear and had a pH of about 8.8.

Lignin Nanoparticle-Polymer Complex

Figure 11:
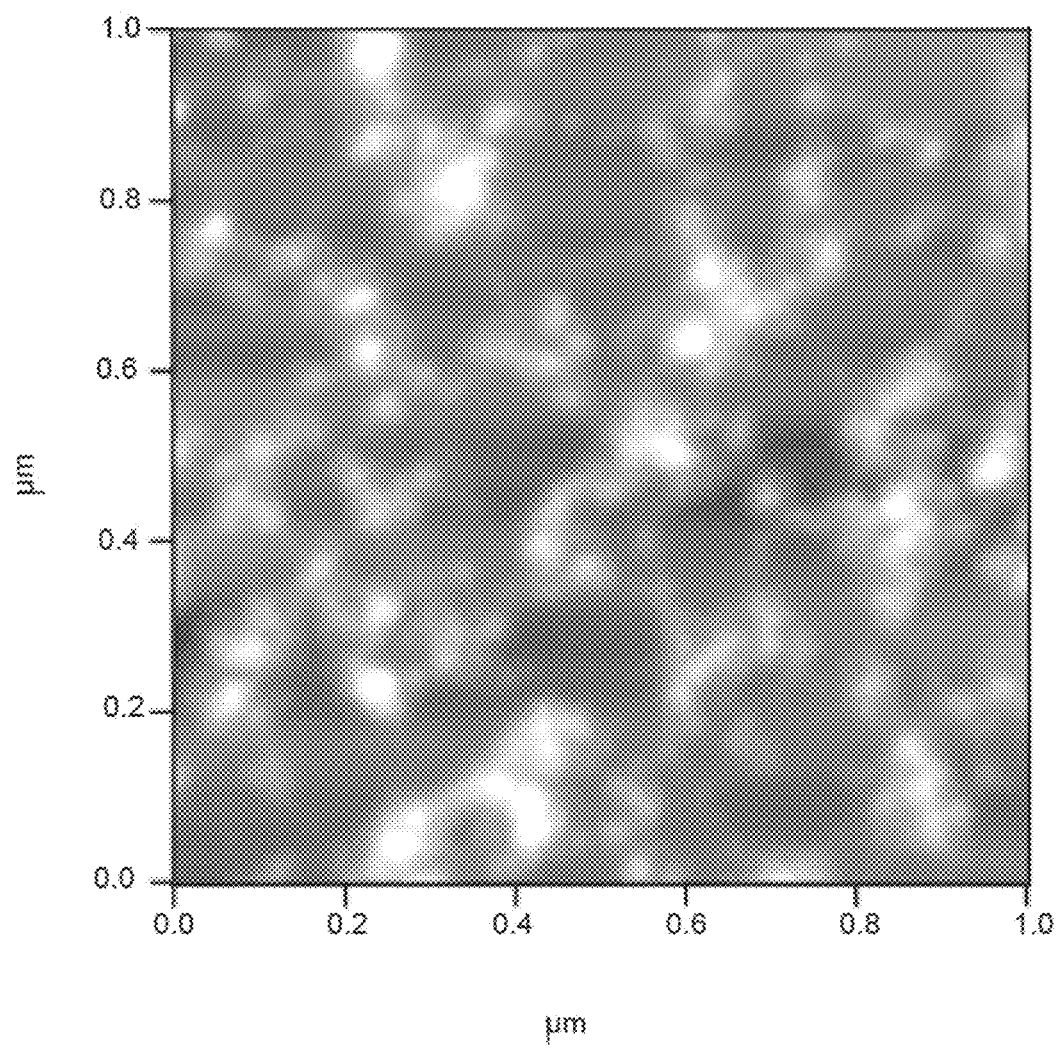
FIG. 11 is an image obtained with an AFM microscope of a dispersion of a lignin nanoparticle-polymer complex formed by the method disclosed herein of adding a dispersion of lignin nanoparticles derivatized with glycerol carbonate to an aqueous solution of polyvinylpyrrolidone, wherein the weight ratio of polyvinylpyrrolidone to derivatized lignin nanoparticles is about 1:4, and further wherein the lignin nanoparticle-polymer complex dispersion was diluted to 100 ppm active particles and cast on a mica surface.

A lignin nanoparticle-polymer complex was produced as a dispersion by adding an aqueous solution of 2 wt % of the derivatized lignin nanoparticle dispersion from Example A to an aqueous solution of 2 wt % polyvinylpyrrolidone (Plasdone® K-90 from Ashland, Inc.). The derivatized lignin nanoparticle dispersion was added to the polyvinylpyrrolidone at increasing ratios while mixing and monitoring the viscosity of the mixture. At a weight ratio of 1:4 polyvinylpyrrolidone to derivatized lignin nanoparticles, a viscosity spike was observed (FIG. 3) indicating that a lignin nanoparticle-polymer complex network had formed. This dispersion was found to have a particle size in the range between 15 and 40 nm (see FIG. 11), as measured by an AFM microscope with the described procedure in above example. A similar ratio of polymer to lignin nanoparticles also resulted in viscosity maximums when using the above-described lignin nanoparticle dispersion and the derivatized lignin nanoparticle dispersion of Example B. It was also found that such lignin nanoparticle-polymer complexes are more stable and still have wetting and hydrophilisation properties at more acidic conditions down to a pH of about 2.5. However, it was observed that the particles appear to grow larger at a pH of around 2 to 3.

Figure 12:
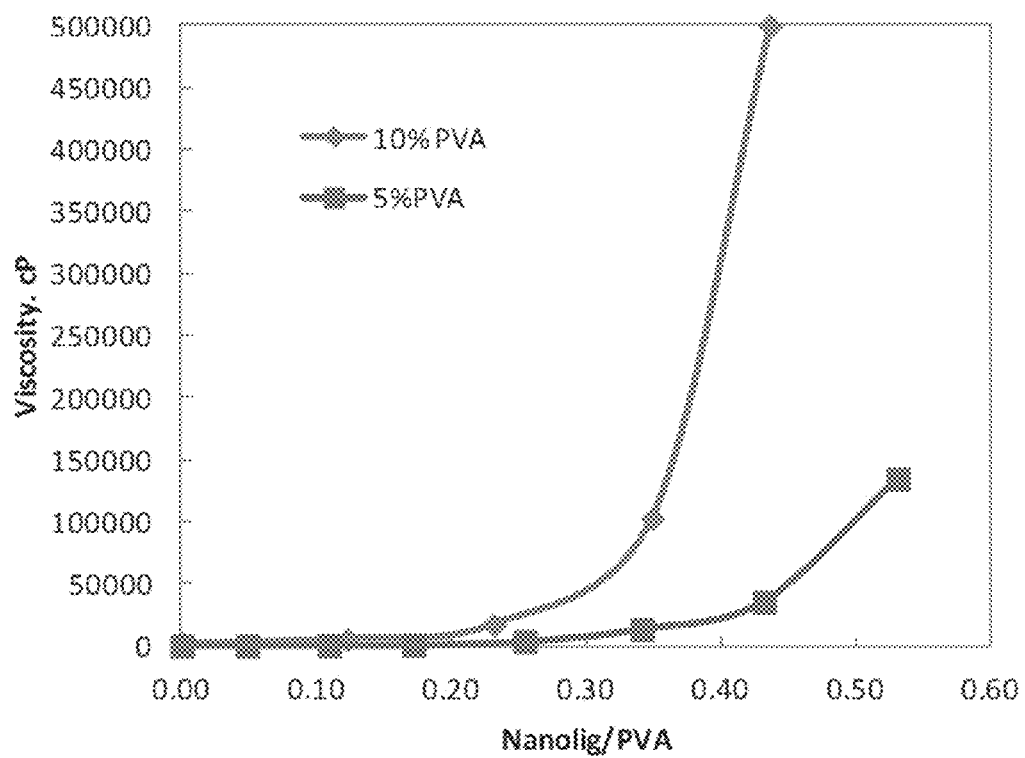
FIG. 12 is a graphical representation illustrating that, for one embodiment, at the indicated ratios of lignin nanoparticles to water dispersible and/or water soluble polymer, a viscosity maximum occurs demonstrating the formation of a lignin nanoparticle-polymer complex.
Figure 13:
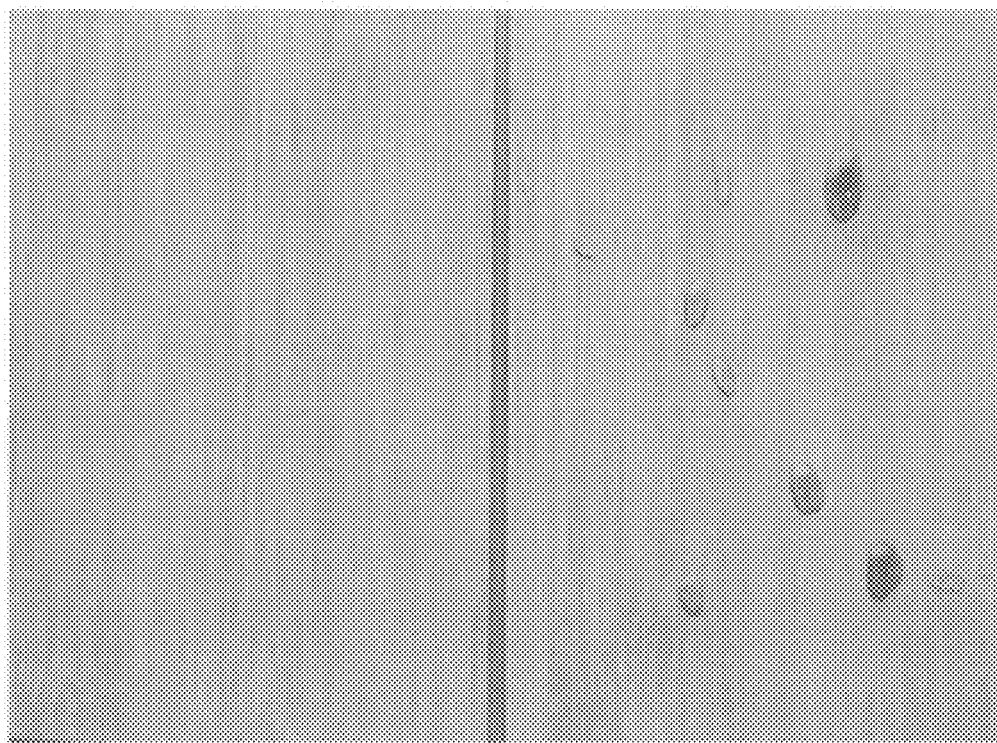
FIG. 13 is a photographic image documenting that treating a vinyl surface with a dispersion of a lignin nanoparticle-polymer complex provides the surface with improved wetting properties as compared to an untreated vinyl surface.
Figure 14:
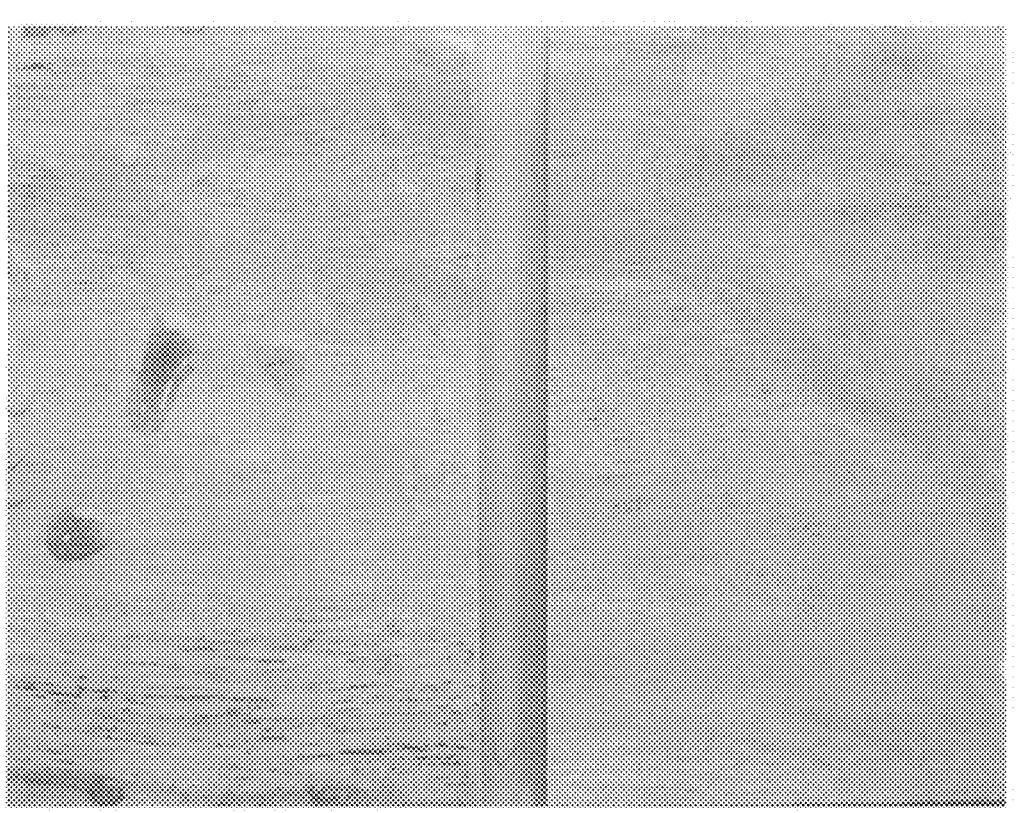
FIG. 14 is a photographic image documenting that treating a laminate surface with a dispersion of a lignin nanoparticle-polymer complex provides the surface with improved wetting properties as compared to an untreated laminate surface.
Figure 15:
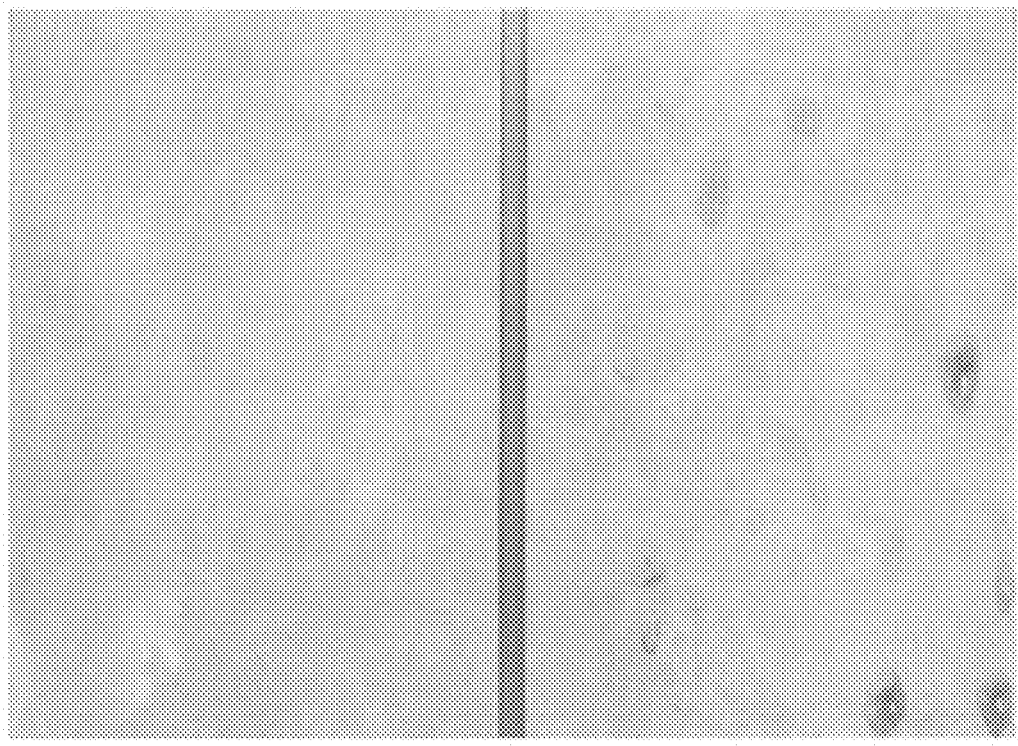
FIG. 15 is a photographic image documenting that treating a vinyl surface with a dispersion of a lignin nanoparticle-polymer complex provides the surface with improved wetting properties as compared to an untreated vinyl surface.
Figure 16:
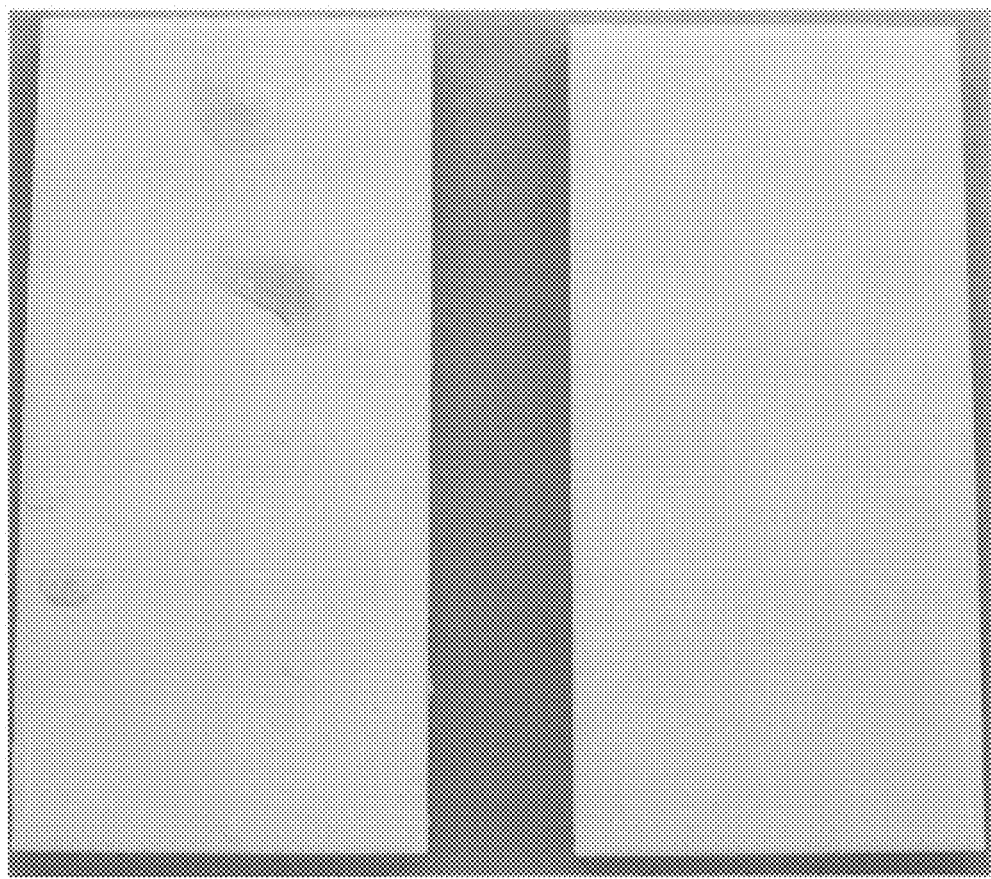
FIG. 16 is a photographic image documenting that treating a ceramic surface with a dispersion of a lignin nanoparticle-polymer complex provides the surface with improved wetting properties as compared to an untreated ceramic surface.
Figure 17:
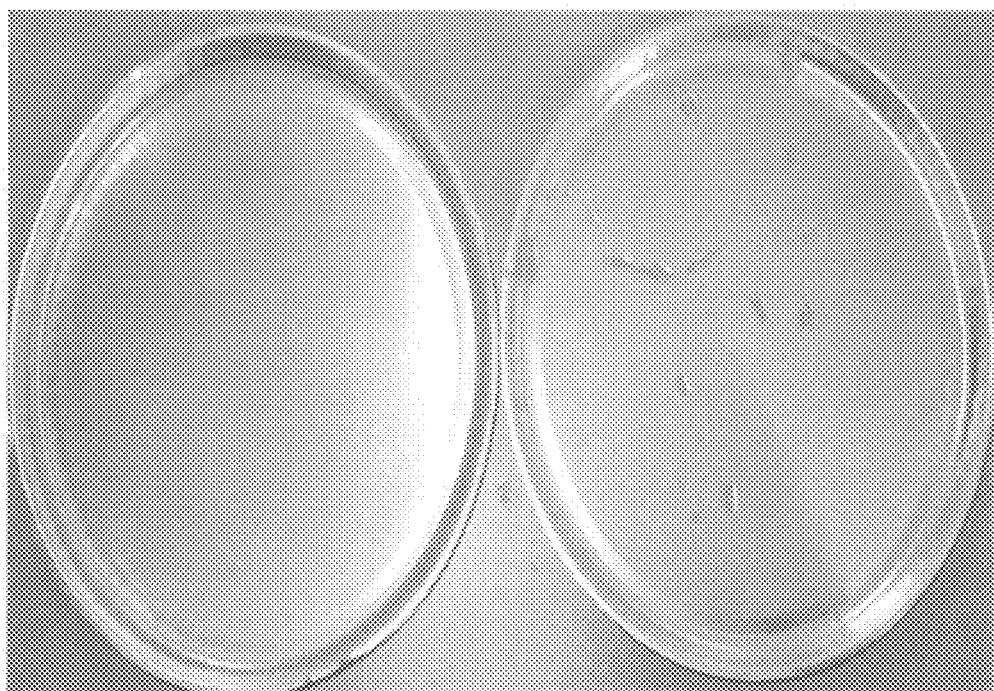
FIG. 17 is a photographic image documenting that treating an aluminum surface with a dispersion of a lignin nanoparticle-polymer complex provides the surface with improved wetting properties as compared to an untreated aluminum surface.
Figure 18:
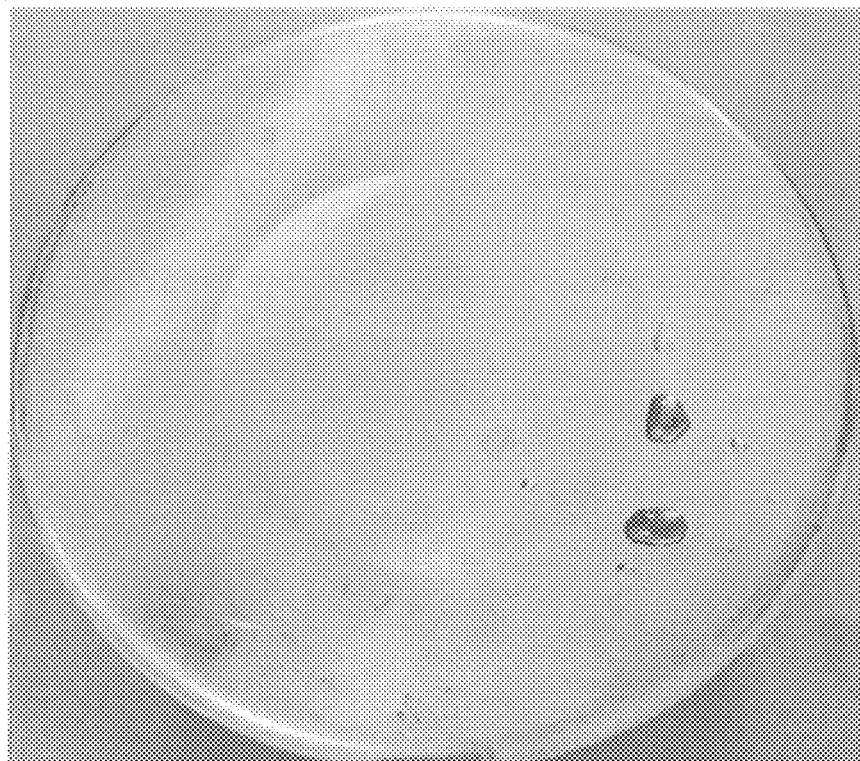
FIG. 18 is a photographic image documenting that treating a stainless steel surface with a dispersion of a lignin nanoparticle-polymer complex provides the surface with improved wetting properties as compared to an untreated stainless steel surface.
Figure 19:
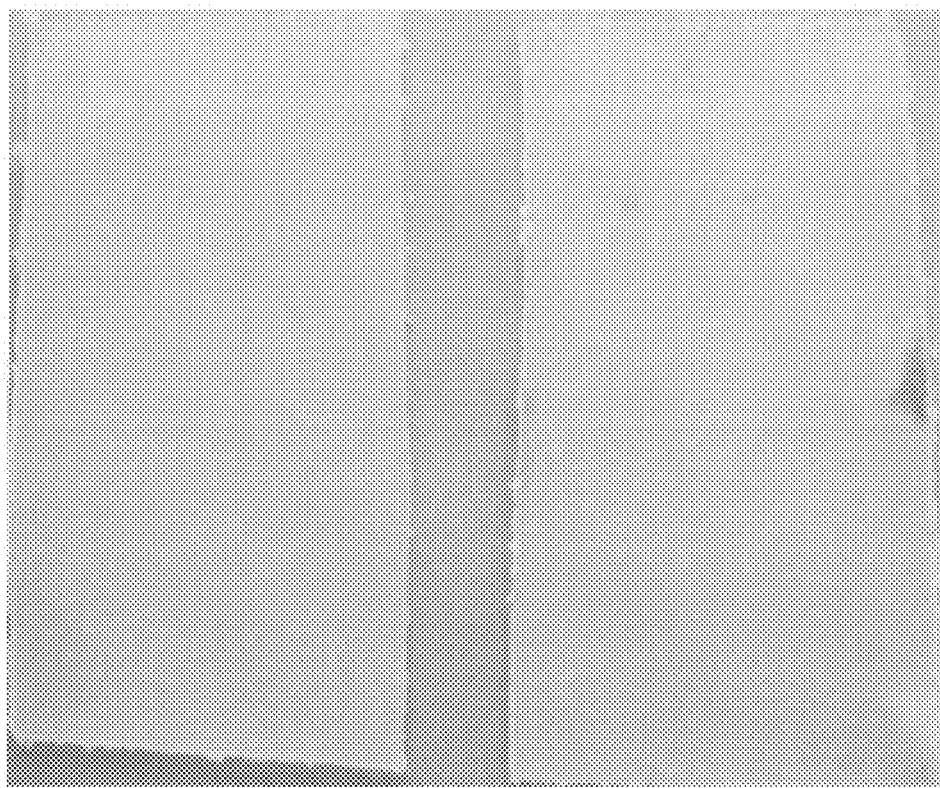
FIG. 19 is a photographic image documenting that treating a polypropylene surface with a dispersion of a lignin nanoparticle-polymer complex provides the surface with improved wetting properties as compared to an untreated polypropylene surface.
Figure 20:
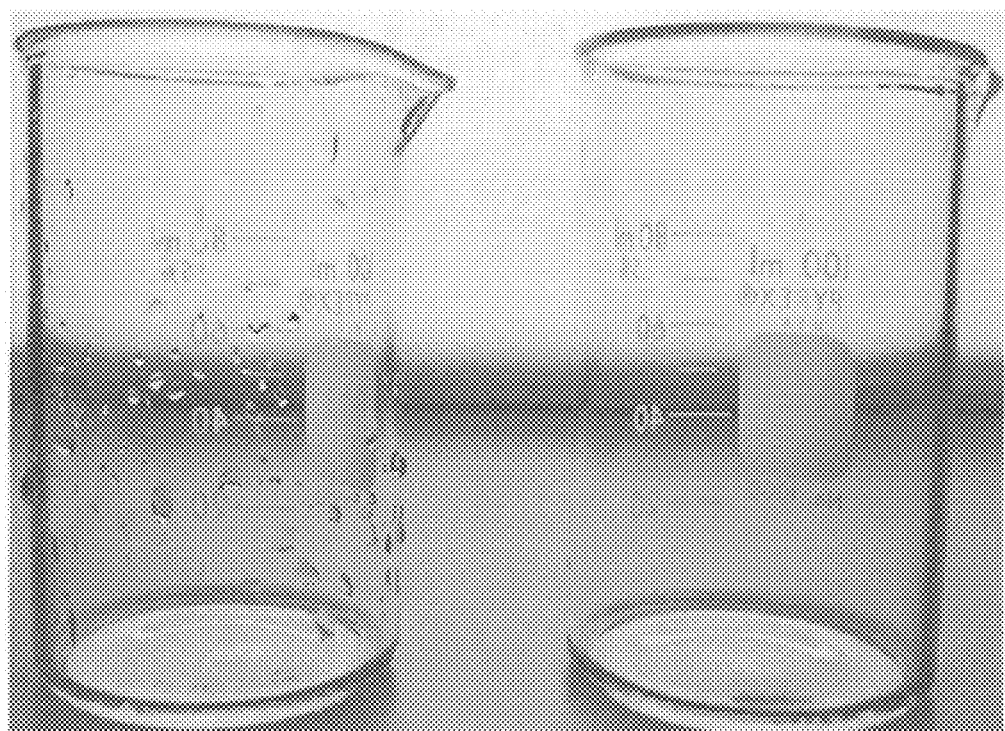
FIG. 20 is a photographic image documenting that treating a glass surface with a dispersion of a lignin nanoparticle-polymer complex provides the surface with improved wetting properties as compared to an untreated glass surface.

A second lignin nanoparticle-polymer complex was produced as a dispersion by adding an aqueous lignin nanoparticle dispersion comprising 23 wt % solids to a 10 wt % aqueous solution of polyvinyl alcohol (PVA 88-50) and mixing. The viscosity of the mixture was monitored using a Brookfield® viscometer (Middleboro, Mass.) as increasing amounts of lignin nanoparticles were added at room temperature. As can be seen in FIG. 12, a dramatic increase in viscosity was observed when the weight ratio of active lignin to active polyvinyl alcohol went beyond 1:3 indicating that a lignin-nanoparticle-polymer complex had formed. As also shown in FIG. 12, when a 5 wt % solution of the polyvinyl alcohol (PVA 88-50) was used in the same procedure, an increase in viscosity was also observed, although less dramatic and requiring a higher portion of lignin nanoparticles, thereby also indicating the formation a lignin nanoparticle-polymer complex network.

Modification of Surfaces to Provide Rinse-Resistant Wetting Properties

It was observed that applying dispersions of lignin nanoparticles, derivatized lignin nanoparticles, and/or lignin nanoparticle-polymer complexes provides organic and inorganic surfaces with excellent wetting properties.

The following procedure was used to demonstrate the wetting properties afforded to surfaces: 1) a dispersion was prepared by one of the methods outlined above, 2) the dispersion was applied onto the surfaces of an article until the surface was fully wetted, 3) the surface was rinsed with tap water, followed by rinsing the surface with water that had been dyed. After rinsing with the dyed water, the treated surfaces were compared to non-treated surfaces of like materials. FIGS. 13-20 illustrate such comparisons corresponding to surfaces of vinyl, laminate, vinyl, ceramic, aluminum, stainless steel, polypropylene, and glass, respectively. The treated surfaces shown in FIGS. 13-20 were treated with a diluted dispersion of a lignin nanoparticle-polymer complex prepared by adding an aqueous solution of 2 wt % of the derivatized lignin nanoparticle dispersion from Example A to an aqueous solution of 2 wt % polyvinylpyrrolidone (Plasdone® K-90 from Ashland, Inc.) until a weight ratio of polyvinylpyrrolidone to derivatized lignin nanoparticles of 1:4 was met. The mixture was further diluted with water to about 0.5% by weight. As can be seen in FIGS. 13-20, treating a surface with such a dispersion of a lignin nanoparticle-polymer complex clearly provides improved wetting properties over untreated surfaces.

Figure 21:
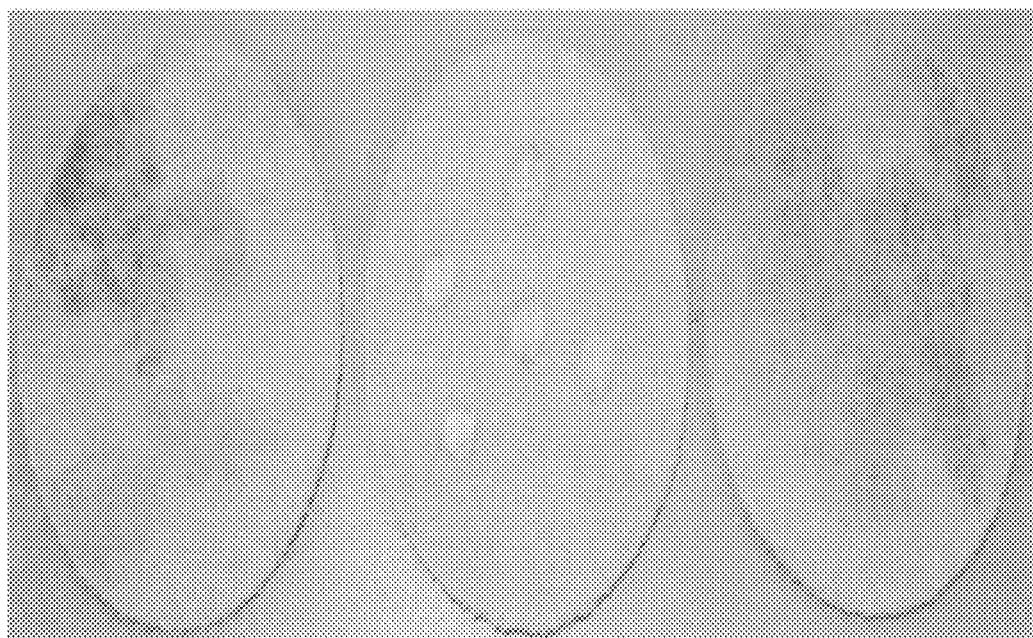
FIG. 21 is a photographic image documenting that treating a felt fabric surface with a dispersion of a lignin nanoparticle-polymer complex provides the surface with improved wetting properties as compared to an untreated felt fabric surface.
Figure 22:
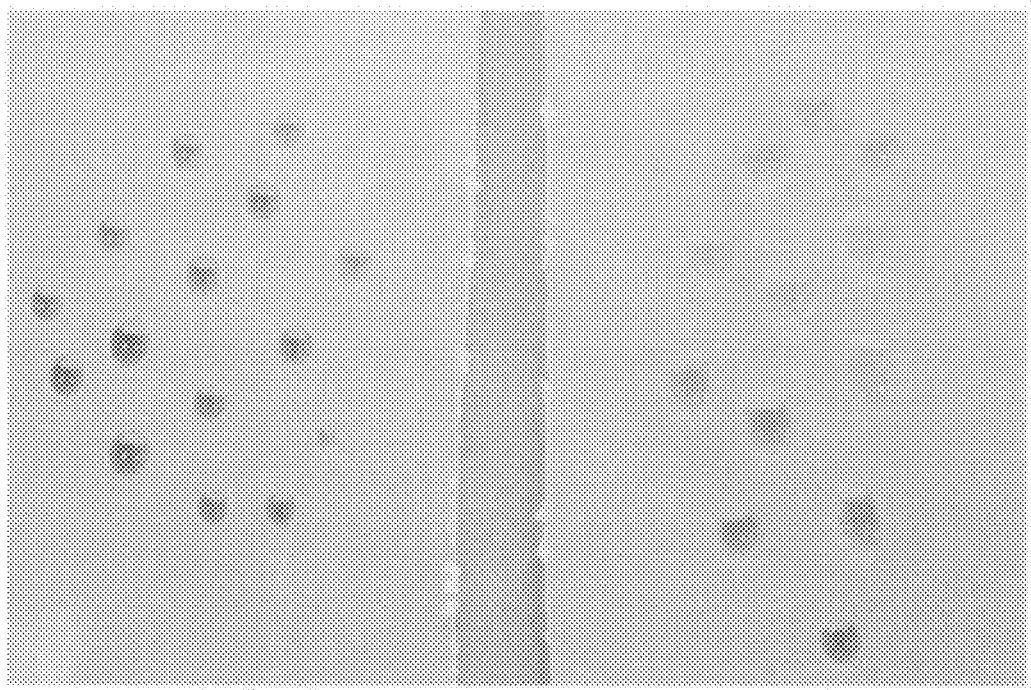
FIG. 22 is a photographic image also documenting that treating a polypropylene surface with a dispersion of a lignin nanoparticle-polymer complex provides the surface with better improved properties as compared to an untreated polypropylene surface.
Figure 23:
FIG. 23 is a photographic image also documenting that treating an aluminum surface with a dispersion of a lignin nanoparticle-polymer complex provides the surface with improved wetting properties as compared to an untreated aluminum surface.

An additional procedure was used to demonstrate such wetting properties using contact angle observations: 1) surface of an article was dried at 50° C., and 2) droplets of water were added onto the surface. The droplets on the surfaces were observed to discern the wetting properties afforded to the treated surfaces (i.e., how well the droplets spread out on the surfaces) compared to non-treated surfaces. FIGS. 21-23 illustrate such observations corresponding to surfaces made of felt fabric, polypropylene, and aluminum, respectively. The treated surfaces shown in FIGS. 21-23 were treated with a dispersion of a lignin nanoparticle-polymer complex prepared by adding an aqueous solution of 2 wt % of the derivatized lignin nanoparticle dispersion from Example A to an aqueous solution of 2 wt % polyvinylpyrrolidone (Plasdone® K-90 from Ashland, Inc.) until a weight ratio of polyvinylpyrrolidone to derivatized lignin nanoparticles of 1:4 was met. The mixture was further diluted with water to about 0.5% by weight. As can be seen in FIGS. 21-23, treating a surface with such a dispersion of a lignin nanoparticle-complex clearly provides improved properties over untreated surfaces. Additionally, it was observed that dispersions of lignin nanoparticle-polymer complexes are able to impart such wetting properties when applied at concentrations as low as 200 ppm in aqueous solution.

Impact of Nanolignin Dispersions on Hydrosheeting Behavior

A further procedure was used to characterize the surface modification properties of lignin nanoparticles. In particular, the hydrosheeting behavior of lignin nanoparticles was compared against controls selected from water, a lignin solution, and polyvinylpyrrolidone on aluminum and/or polypropylene substrates. The test method consisted of diluting various samples of lignin nanoparticle dispersions to four weight percent with deionized water—the two lignin nanoparticle dispersions corresponding to sample 16 in Table 2 and sample 38 in Table 6—and visually comparing the hydrosheeting behavior of the lignin nanoparticle dispersions against the aforementioned controls. A 2-inch by 4-inch by 0.25-inch rectangular bar of substrate was submerged in the respective sample dispersion or solution for 60 seconds, the bar was removed and the excess solution was allowed to drip off for approximately 15 seconds, after which time the bars were placed 6.5 inches under a spigot of continuously running, 40 deg C. tap water for the time specified in the table. The results are presented in Table 10, which demonstrate that substrate surfaces treated with nanolignin dispersion, are thoroughly wetted and water flows over the surface in a persistent, even sheet-like fashion (effect remains after 45 min of rinsing). In comparison, substrates treated with traditional wetting agents, lose their water sheeting effect in a shorter time than substrates treated with nanolignin solution (the wetting effect is not as persistent). Thus, the improved wetting characteristics of substrates treated with nanolignin dispersions are more persistent than when the substrates are treated with other common wetting agents.

From the above description, it is clear that the inventive concept(s) disclosed herein is well adapted to carry out the object and to attain the advantages mentioned herein as well as those inherent in the inventive concept(s) disclosed herein. While exemplary embodiments of the inventive concept(s) disclosed herein have been described for purposes of this disclosure, it will be understood that numerous changes may be made which will readily suggest themselves to those skilled in the art and which are accomplished without departing from the scope of the inventive concept(s) disclosed herein and defined by the appended claims.

TABLE 10

| Sample | Sample Conc. (%) | Substrate | Length of time rinsing | Visual Hydro-sheeting Result | | Length of time rinsing | Visual Hydro-sheeting Result | |
|---|---|---|---|---|---|---|---|---|
| Water Control | 100 | Aluminum | 20 seconds | Water flowed in channels | Several drops remained when water flow stopped | 45 min | Water flowed in channels | Several drops remained when water flow stopped |
| Nanolignin dispersion | 4 | Aluminum | 20 seconds | Water flowed as a single sheet | No water drops remained when water flow stopped | 45 min | Water flowed as a single sheet | No water drops remained when water flow stopped |
| Lignin solution | 4 | Aluminum | 20 seconds | Water flowed as a single sheet | No water drops remained when water flow stopped | 45 min | Water flowed in some channels | Some drops remained when water flow stopped |
| Polyvinyl-pyrolidone | 4 | Aluminum | 20 seconds | Water flowed as a single sheet | No water drops remained when water flow stopped | 45 min | Water flowed in some channels | Some drops remained when water flow stopped |
| Water Control | 100 | Polypropylene | 20 seconds | Water flowed in channels | Several drops remained when water flow stopped | 45 min | Water flowed in channels | Several drops remained when water flow stopped |
| Nanolignin dispersion | 4 | Polypropylene | 20 seconds | Water flowed as a single sheet | No water drops remained when water flow stopped | 45 min | Water flowed as a single sheet | No water drops remained when water flow stopped |

What is claimed is:

1. A method of preparing an aqueous lignin nanoparticle dispersion, comprising the steps of:
   combining (a) lignin, and (b) water, to form an aqueous composition
   adjusting the pH of the aqueous composition with a base, wherein the base is not an inorganic divalent base, to form a lignin composition, that does not form a lignin solution, comprising from about 1 to about 70 wt % lignin, and
   heating the lignin composition while mixing to form a stable dispersion of lignin nanoparticles.

2. The method of claim 1, wherein the base is selected from the group consisting of alkali hydroxides, ammonium hydroxide, alkyl-substituted ammonium hydroxides, organic amines, alkali carbonates or bicarbonates, ammonium carbonates or bicarbonates, alkyl-substituted ammonium carbonates or bicarbonates, and combinations thereof.

3. The method of claim 2, wherein the base is selected from the group consisting of ammonium hydroxide, potassium carbonate, potassium hydroxide, sodium carbonate, sodium hydroxide, triethanolamine, and combinations thereof.

4. The method of claim 1, wherein the lignin and water are combined prior to adding the base, forming a mixture of lignin and water having a pH less than or equal to 6.

5. The method of claim 4, wherein the base is added until the mixture has a pH in the range of from about 7 to about 9.

6. The method of claim 4, wherein the base is ammonium hydroxide.

7. The method of claim 6, wherein the ammonium hydroxide is added until the mixture has a pH in the range of from about 7 to about 10.5.

8. The method of claim 1, wherein the lignin is produced from a process selected from the group consisting of kraft, solvent extraction, biofuel processing, organosolv, Bjorkman process, steam explosion, cellulolytic enzyme, acid hydrolysis, soda lime, and combinations thereof.

9. The method of claim 8, wherein the lignin is produced from the kraft process and isolated by at least one of the LignoBoost® and LignoForce™ processes.

10. The method of claim 1, wherein the lignin is derivatized lignin.

11. The method of claim 1, wherein the lignin composition comprises from about 5 to about 40 wt % lignin.

12. The method of claim 1, wherein the lignin composition comprises from about 15 to about 30 wt % lignin.

13. The method of claim 1, wherein the lignin composition is heated to a temperature in the range of from about 50° C. to about 120° C., wherein the lignin composition is at a pressure greater than 1 atm for temperatures in the range of from about 100° C. to about 120° C.

14. The method of claim 13, wherein the lignin composition is heated to a temperature in the range of from about 70° C. to about 100° C.

15. The method of claim 1, wherein the stable dispersion of lignin nanoparticles comprises (i) nanoparticles having an effective particle size in the range of from about 30 to about 600 nanometers, and (ii) a signal intensity in the range of from about 85 to about 550 kilo counts per second for a 0.01 wt % concentration of the lignin nanoparticles in the dispersion.

16. The method of claim 1, wherein the stable dispersion of lignin nanoparticles comprises (i) nanoparticles having an effective particle size in the range of from about 70 to about 350 nanometers, and (ii) a signal intensity in the range of from about 200 to about 550 kilo counts per second for a 0.01 wt % concentration of the lignin nanoparticles in the dispersion.

17. The method of claim 1, wherein the stable dispersion of lignin nanoparticles remains homogenous for at least 4 days at ambient conditions.

\* \* \* \* \*